United States Patent
Feris et al.

(10) Patent No.: US 8,934,670 B2
(45) Date of Patent: *Jan. 13, 2015

(54) REAL TIME PROCESSING OF VIDEO FRAMES FOR TRIGGERING AN ALERT

(75) Inventors: Rogerio Schmidt Feris, White Plains, NY (US); Arun Hampapur, Norwalk, CT (US); Zuoxuan Lu, Yorktown Heights, NY (US); Ying-li Tian, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/597,902

(22) Filed: Aug. 29, 2012

(65) Prior Publication Data
US 2012/0320269 A1    Dec. 20, 2012

Related U.S. Application Data

(63) Continuation of application No. 12/054,717, filed on Mar. 25, 2008, now Pat. No. 8,284,249.

(51) Int. Cl.
*G06K 9/00* (2006.01)
*G06T 7/20* (2006.01)

(52) U.S. Cl.
CPC ..... *G06T 7/2053* (2013.01); *G06T 2207/20141* (2013.01); *G06K 9/00771* (2013.01); *G06T 2207/30232* (2013.01); *G06T 2207/20036* (2013.01); *G06T 2207/10016* (2013.01)
USPC ............................ 382/103; 348/143; 348/701

(58) Field of Classification Search
CPC ................. G06K 9/00771; G06T 2207/10016
USPC ....................................................... 348/701
See application file for complete search history.

(56) References Cited

U.S. PATENT DOCUMENTS

| 7,418,134 B2 | 8/2008 | Schwartz et al. |
| 7,558,404 B2 | 7/2009 | Ma |

(Continued)

FOREIGN PATENT DOCUMENTS

| JP | 1245395 | 9/1989 |
| JP | 2006514363 | 4/2006 |

(Continued)

OTHER PUBLICATIONS

Lindsay et al.; RFID Locating Systems for Linking Valued Objects with Multimedia Filed; IPCOM21113D; Dec. 23, 2003; pp. 1-10.

(Continued)

*Primary Examiner* — Jay Patel
*Assistant Examiner* — Yulin Sun
(74) *Attorney, Agent, or Firm* — Schmeiser, Olsen & Watts, LLP; Matthew Chung

(57) ABSTRACT

A method and system for real time processing of a sequence of video frames. A current frame in the sequence and at least one frame in the sequence occurring prior to the current frame is analyzed. Each frame includes a two-dimensional array of pixels. The sequence of video frames is received in synchronization with a recording of the video frames in real time. The analyzing includes performing a background subtraction on the at least one frame, which determines a background image and a static region mask associated with a static region consisting of a contiguous distribution of pixels in the current frame. The static region mask identifies each pixel in the static region upon the static region mask being superimposed on the current frame. The background image includes the array of pixels and a background model of the at least one frame and does not include any moving object.

10 Claims, 17 Drawing Sheets

(56) References Cited

U.S. PATENT DOCUMENTS

| | | |
|---|---|---|
| 7,567,702 B2 | 7/2009 | Woodfill et al. |
| 7,620,266 B2 | 11/2009 | Brown et al. |
| 7,916,944 B2 | 3/2011 | Yang et al. |
| 7,925,077 B2 | 4/2011 | Woodfill et al. |
| 8,107,678 B2 | 1/2012 | Feris et al. |
| 8,284,249 B2 | 10/2012 | Feris et al. |
| 2004/0062439 A1 | 4/2004 | Cahill et al. |
| 2004/0131254 A1 | 7/2004 | Liang et al. |
| 2004/0151342 A1 | 8/2004 | Venetianer et al. |
| 2005/0036658 A1 | 2/2005 | Gibbins et al. |
| 2005/0271280 A1 | 12/2005 | Farmer et al. |
| 2007/0160286 A1 | 7/2007 | Haque |
| 2007/0195993 A1 | 8/2007 | Chen et al. |
| 2008/0018738 A1 | 1/2008 | Lipton et al. |
| 2008/0181499 A1 | 7/2008 | Yang et al. |
| 2008/0226172 A1 | 9/2008 | Connell |
| 2008/0247599 A1 | 10/2008 | Porikli et al. |
| 2009/0034797 A1 | 2/2009 | Senior |
| 2009/0067716 A1 | 3/2009 | Brown et al. |
| 2009/0110236 A1 | 4/2009 | Huang et al. |
| 2009/0238462 A1 | 9/2009 | Feris et al. |
| 2009/0244390 A1 | 10/2009 | Feris et al. |
| 2012/0027248 A1 | 2/2012 | Feris et al. |

FOREIGN PATENT DOCUMENTS

| | | |
|---|---|---|
| WO | 2008008045 | 1/2008 |
| WO | 2009031751 | 3/2009 |
| WO | 2009066994 | 5/2009 |

OTHER PUBLICATIONS

IBM; System and method to enrich images with semantic data; IPCOM156659D; 2007; Jul. 30, 2007; pp. 1-10.

Tian et al.; Real-Time Detection of Abandoned and Removed Objects in Complex Environments; Proceedings of 8th International Workshop on Visual Surveillance; 2008; pp. 1-8.

Auvinet et al.; Left-luggage detection using homographies and simple heuristics, in PETS, 2006; pp. 51-58.

Beynon et al.; Detecting Abandoned Packages in a Multi-camera Video Surveillance System, IEEE International Conference on Advanced Video and Signal-Based Surveillance; Jul. 21-22, 2003; pp. 1-8.

Connell et al.; Detection and Tracking in the IBM PeopleVision System, IEEE International Conference on Mutlimedia and Expo; Jun. 30, 2004, pp. 1-4.

Guler et al.; Stationary Objects in Multiple Object Tracking; IEEE International Conference on Advance Video and Signal-Based Surveillance, Sep. 5, 2007; pp. 248-253.

Kranhstoever et al.; Multiview Detection and Tracking of Travelers and Luggage in Mass Transit Environments; 9th IEEE International Workshop on Performance Evaluation of Tracking and Surveillance; Jun. 18, 2006; pp. 67-74.

Martinez-Del-Rincon et al.; Automatic Left Luggage Detection and Tracking using Multi Camerias; 9th IEEE International Workshop on Performance Evaluation of Tracking and Surveillance; Jun. 18, 2006; pp. 59-66.

Smith et al.; Detecting Abandoned Luggage Items in a Public Space, in PETS; 2006; pp. 75-82.

Jouet et al.; Tracking Method Using Infrared Pictures; IPCOM146207D; Feb. 7, 2007; pp. 1-3.

Lindsay et al.; Improved Wearable Sensor Systems; IPCOM30041D; Jul. 23, 2004; pp. 1-20.

Lindsay et al.; Retail RFID Systems without Smart Shelves; IPCOM21114D; Dec. 23, 2003; pp. 1-9.

Reade et al.; RFID Systems for Enhances Shopping Experiences; IPCOM21115D; Dec. 23, 2003; pp. 1-12.

Office Action (Mail Date Jul. 30, 2012) for U.S. Appl. No. 12/844,330, filed Jul. 27, 2010.

Amendment filed Oct. 23, 2012 in response to Office Action (Mail Date Jul. 30, 2012) for U.S. Appl. No. 12/844,330, filed Jul. 27, 2010.

U.S. Statutory Invention Registration No. H1980H; Inventor James R. Cloutier, Publication Date Aug. 7, 2001; 8 pages.

Sacchi et al.; A distributed Surveillance System for Detection of Abandoned Objects in Unmanned Railway Environments; IEEE Transaction on Vehicular Technology, vol. 49, No. 5, Sep. 2000; pp. 2013-2026.

Tian et al.; Robust and Efficient Foreground Analysis for Real-time Video Surveillance; Proceedings of the 2005 IEEE Computer Society Conference on Computer Vision and Pattern Recognition (CVPR '05); 6 pages.

Brown, Lisa W.; View Independent Vehicle/Person Classification; VSSN '04, Oct. 15, 2004, 10 pages.

Stauffer et al,; Adaptive Background Mixture Models for Real-Time Tracking; 1999 IEEE; pages 246-262.

Notice of Allowance (Mail Date Sep. 29, 2011) for U.S. Appl. No. 12/053,827; Filing Date Mar. 24, 2008; Confirmation No. 5026.

Office Action (Mail Date Jul. 27, 2011) for U.S. Appl. No. 12/054,717; Filing Date Mar. 25, 2008; Confirmation No. 6591.

Amendment filed Oct. 27, 2011 in response to Office Action (Mail Date Jul. 27, 2011) for U.S. Appl. No. 12/054,717; Filing Date Mar. 25, 2008; Confirmation No. 6591.

Final Office Action (Mail Date Mar. 2, 2012) for U.S. Appl. No. 12/054,717; Filing Date Mar. 25, 2008; Confirmation No. 6591.

Amendment filed May 1, 2012 in response to Final Office Action (Mail Date Mar. 2, 2012) for U.S. Appl. No. 12/054,717; Filing Date Mar. 25, 2008; Confirmation No. 6591.

Advisory Action (Mail Date May 15, 2012) for U.S. Appl. No. 12/054,717; Filing Date Mar. 25, 2008; Confirmation No. 6591.

Notice of Allowance (Mail Date Jun. 1, 2012) for U.S. Appl. No. 12/054,717; Filing Date Mar. 25, 2008; Confirmation No. 6591.

Office Action (mail date May 8, 2014) for application No. 13/887,629, filing date May 6, 2013, Conf. No. 5832.

REAL TIME PROCESSING OF VIDEO FRAMES FOR TRIGGERING AN ALERT

This application is a continuation application claiming priority to Ser. No. 12/054,717, filed Mar. 25, 2008, now U.S. Pat. No. 8,284,249, issued Oct. 9, 2012.

RELATED APPLICATION

The present application is related to U.S. patent application Ser. No. 12/053,827, filed, Mar. 24, 2008, now U.S. Pat. No. 8,107,678, issued Jan. 31, 2012, and entitled "DETECTION OF ABANDONED AND REMOVED OBJECTS IN A VIDEO STREAM".

FIELD OF THE INVENTION

The present invention relates to real time processing of video frames of a video stream received in synchronization with a recording of the video frames in real time.

BACKGROUND OF THE INVENTION

Current video processing methods do not trigger an alarm in response to satisfying pertinent requirements in conjunction with objects detected in real time processing. Thus, there is a need for a method and system for triggering an alarm in response to satisfying pertinent requirements in conjunction with objects detected in real time video processing.

SUMMARY OF THE INVENTION

The present invention provides a method for real time processing of a sequence of video frames received in synchronization with a recording of the video frames in real time for triggering an alert, each frame comprising a two-dimensional array of pixels and a frame-dependent color intensity at each pixel, said method implemented by execution of program code on a processor of a computer system, said method comprising:

analyzing a current frame and at least one frame occurring prior to the current frame in the sequence, said analyzing comprising performing a background subtraction on the at least one frame to determine a background image and a static region mask associated with a static region, said background image comprising the array of pixels and a background model of the at least one frame and not comprising any moving object, said static region consisting of a contiguous distribution of pixels of the array of pixels, said analyzing determining an existence of a static object consisting of either an abandoned object existing in the static region of the current frame and not existing in the static region of the background image or a removed object existing in the static region of the background image and not existing in the static region of the current frame;

after said analyzing, determining a status of the static object, said status being an abandoned status if the static object is said abandoned object or a removed status if the static object is said removed object;

storing in a data storage medium of the computer system: the determined status, a time of a reference frame consisting of the current frame at which the status was determined, the static region in the reference frame, and the static object;

after said determining the status of the static object, ascertaining that a plurality of requirements has been satisfied, said plurality of requirements comprising a persistence requirement, a non-persistence duration requirement, and a persistence duration requirement;

responsive to said ascertaining that the plurality of requirements has been satisfied, triggering the alert, wherein the persistence requirement is that the static region in each frame of a plurality of frames is persistent relative to the reference frame, said plurality of frames occurring during a time interval immediately following a time of occurrence of the reference frame, wherein the non-persistence duration requirement is that for each frame of one or more frames in at least one time period during the time interval, the static region is non-persistent relative to the static region in the reference frame and that a cumulative time duration ($T_{NP}$) encompassed by the one or more frames is less than a specified non-persistence duration threshold ($T_1$), wherein the persistence duration requirement is that a cumulative time duration ($T_{TOT}$) encompassed by the plurality of frames occurs only after the at least one time period has elapsed and exceeds a specified persistence duration threshold ($T_2$) characterized by $T_2 > T_1$.

The present invention provides a computer program product, comprising a computer usable storage medium having a computer readable program code stored therein, said computer readable program code comprising an algorithm adapted to implement a method for real time processing of a sequence of video frames received in synchronization with a recording of the video frames in real time for triggering an alert, each frame comprising a two-dimensional array of pixels and a frame-dependent color intensity at each pixel, said method implemented by execution of program code on a processor of a computer system, said method comprising:

analyzing a current frame and at least one frame occurring prior to the current frame in the sequence, said analyzing comprising performing a background subtraction on the at least one frame to determine a background image and a static region mask associated with a static region, said background image comprising the array of pixels and a background model of the at least one frame and not comprising any moving object, said static region consisting of a contiguous distribution of pixels of the array of pixels, said analyzing determining an existence of a static object consisting of either an abandoned object existing in the static region of the current frame and not existing in the static region of the background image or a removed object existing in the static region of the background image and not existing in the static region of the current frame;

after said analyzing, determining a status of the static object, said status being an abandoned status if the static object is said abandoned object or a removed status if the static object is said removed object;

storing in a data storage medium of the computer system: the determined status, a time of a reference frame consisting of the current frame at which the status was determined, the static region in the reference frame, and the static object;

after said determining the status of the static object, ascertaining that a plurality of requirements has been satisfied, said plurality of requirements comprising a persistence requirement, a non-persistence duration requirement, and a persistence duration requirement;

responsive to said ascertaining that the plurality of requirements has been satisfied, triggering the alert, wherein the persistence requirement is that the static region in each frame of a plurality of frames is persistent relative to the reference frame, said plurality of frames occurring during a time interval immediately following a time of occurrence of the reference frame, wherein the non-persistence duration requirement is that for each frame of one or more frames in at least one time period during the time interval, the static region is non-persistent relative to the static region in the reference frame and that a cumulative time duration ($T_{NP}$) encompassed by the one or more frames is less than a specified non-persistence duration threshold ($T_1$), wherein the persistence duration requirement is that a cumulative time duration ($T_{TOT}$) encompassed by the plurality of frames occurs only after the at least one time period has elapsed and exceeds a specified persistence duration threshold ($T_2$) characterized by $T_2 > T_1$.

The present invention provides a computer system comprising a processor and a computer readable memory unit coupled to the processor, said memory unit containing instructions that when executed by the processor implement a method for real time processing of a sequence of video frames received in synchronization with a recording of the video frames in real time for triggering an alert, each frame comprising a two-dimensional array of pixels and a frame-dependent color intensity at each pixel, said method implemented by execution of program code on a processor of a computer system, said method comprising:

analyzing a current frame and at least one frame occurring prior to the current frame in the sequence, said analyzing comprising performing a background subtraction on the at least one frame to determine a background image and a static region mask associated with a static region, said background image comprising the array of pixels and a background model of the at least one frame and not comprising any moving object, said static region consisting of a contiguous distribution of pixels of the array of pixels, said analyzing determining an existence of a static object consisting of either an abandoned object existing in the static region of the current frame and not existing in the static region of the background image or a removed object existing in the static region of the background image and not existing in the static region of the current frame;

after said analyzing, determining a status of the static object, said status being an abandoned status if the static object is said abandoned object or a removed status if the static object is said removed object;

storing in a data storage medium of the computer system: the determined status, a time of a reference frame consisting of the current frame at which the status was determined, the static region in the reference frame, and the static object;

after said determining the status of the static object, ascertaining that a plurality of requirements has been satisfied, said plurality of requirements comprising a persistence requirement, a non-persistence duration requirement, and a persistence duration requirement;

responsive to said ascertaining that the plurality of requirements has been satisfied, triggering the alert, wherein the persistence requirement is that the static region in each frame of a plurality of frames is persistent relative to the reference frame, said plurality of frames occurring during a time interval immediately following a time of occurrence of the reference frame, wherein the non-persistence duration requirement is that for each frame of one or more frames in at least one time period during the time interval, the static region is non-persistent relative to the static region in the reference frame and that a cumulative time duration ($T_{NP}$) encompassed by the one or more frames is less than a specified non-persistence duration threshold ($T_1$), wherein the persistence duration requirement is that a cumulative time duration ($T_{TOT}$) encompassed by the plurality of frames occurs only after the at least one time period has elapsed and exceeds a specified persistence duration threshold ($T_2$) characterized by $T_2 > T_1$.

The present invention provides a process for supporting computer infrastructure, said process comprising providing at least one support service for at least one of creating, integrating, hosting, maintaining, and deploying computer-readable program code in a computing system, wherein the program code in combination with the computing system is configured to perform a method for real time processing of a sequence of video frames received in synchronization with a recording of the video frames in real time for triggering an alert, each frame comprising a two-dimensional array of pixels and a frame-dependent color intensity at each pixel, said method implemented by execution of program code on a processor of a computer system, said method comprising:

analyzing a current frame and at least one frame occurring prior to the current frame in the sequence, said analyzing comprising performing a background subtraction on the at least one frame to determine a background image and a static region mask associated with a static region, said background image comprising the array of pixels and a background model of the at least one frame and not comprising any moving object, said static region consisting of a contiguous distribution of pixels of the array of pixels, said analyzing determining an existence of a static object consisting of either an abandoned object existing in the static region of the current frame and not existing in the static region of the background image or a removed object existing in the static region of the background image and not existing in the static region of the current frame;

after said analyzing, determining a status of the static object, said status being an abandoned status if the static object is said abandoned object or a removed status if the static object is said removed object;

storing in a data storage medium of the computer system: the determined status, a time of a reference frame consisting of the current frame at which the status was determined, the static region in the reference frame, and the static object;

after said determining the status of the static object, ascertaining that a plurality of requirements has been satisfied, said plurality of requirements comprising a persistence requirement, a non-persistence duration requirement, and a persistence duration requirement;

responsive to said ascertaining that the plurality of requirements has been satisfied, triggering the alert, wherein the persistence requirement is that the static region in each frame of a plurality of frames is persistent relative to the reference frame, said plurality of frames occurring during a time interval immediately following a time of occurrence of the reference frame, wherein the non-persistence duration requirement is that for each frame of one or more frames in at least one time period during the time interval, the static region is non-persistent relative to the static region in the reference frame and that a cumulative time duration ($T_{NP}$) encompassed by the one or more frames is less than a specified non-persistence duration threshold ($T_1$), wherein the persistence duration requirement is that a cumulative time duration ($T_{TOT}$) encompassed by the plurality of frames occurs only after the at least one time period has elapsed and exceeds a specified persistence duration threshold ($T_2$) characterized by $T_2 > T_1$.

The present invention provides a method and system for triggering an alarm in response to satisfying pertinent requirements in conjunction with objects detected in real time video processing.

DETAILED DESCRIPTION OF THE INVENTION

The present invention provides a method and system for real time processing of a sequence of video frames received in synchronization with a recording of the video frames in real time, which means that video frames are being sent to the system as the video frames are being recorded and the system is processing the video frames as the video frames are being received by the system. For example, a video surveillance system may be recording and/or transmitting video frames of real time events occurring in a fixed localized space (e.g., a parking lot) and transmitting in real time the recorded video frames to a processing system that processes the recorded video frames as the recorded video frames are being received. The present invention identifies static objects in the video frames and triggers an alarm if specified requirements relating to the static object is satisfied.

Figure 1:
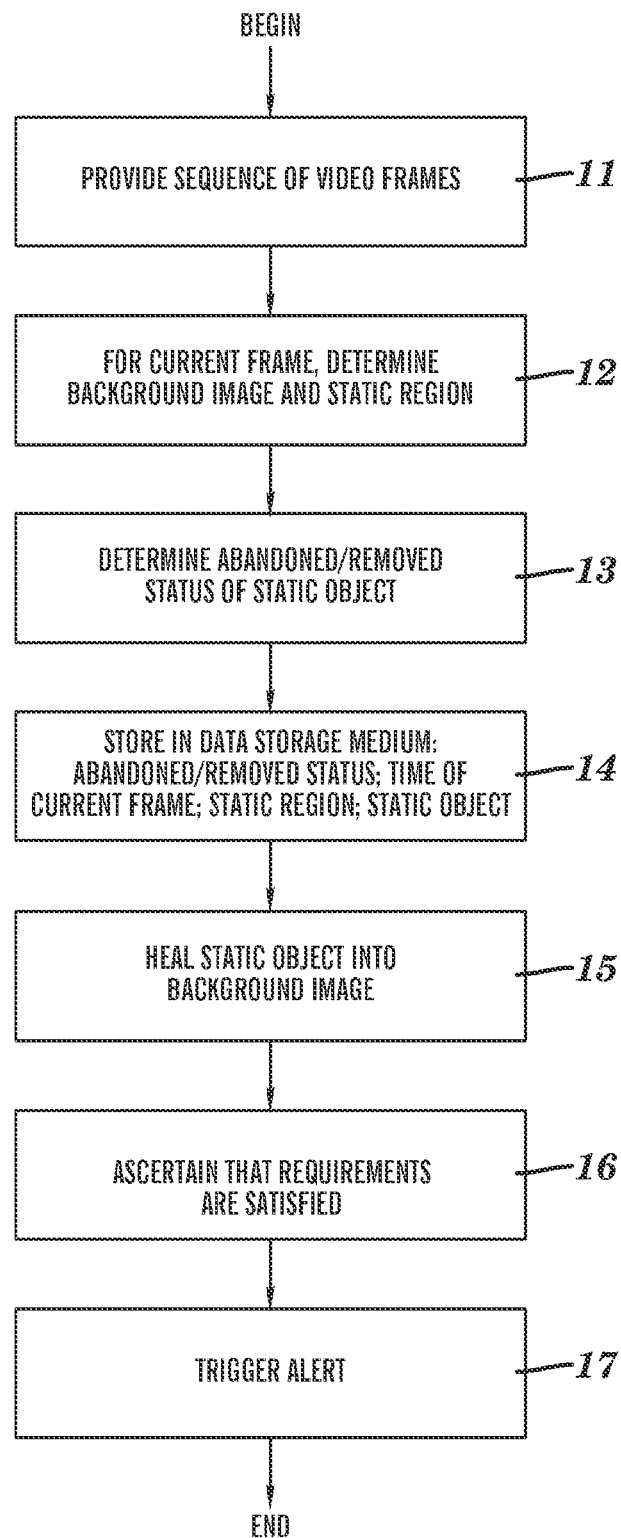
FIG. 1 is a flow chart depicting a method for real time processing of a sequence of video frames of a video stream received in synchronization with a recording of the video frames in real time for triggering an alert, including performing an abandoned/removed object detection algorithm (A/R algorithm) for determining an abandoned/removed status of a static object, in accordance with embodiments of the present invention.

FIG. 1 is a flow chart depicting a method for real time processing a sequence of video frames of a video stream, in accordance with embodiments of the present invention. The method may be implemented by execution of program code on a processor of a computer system, such as the computer system 90 depicted in FIG. 18 and described infra. FIG. 1 depicts steps 11-17.

Step 11 provides the video stream that includes a time-ordered sequence of video frames. In one embodiment, the video stream may be a real time video stream. In one embodiment, the video stream may be received from a video camera connected to a video adapter on a typical state of the art computer or personal computer (PC), provided over a network (e.g., the Internet) as a multimedia file in a multimedia format (e.g., in avi, mpeg, wmv, and etc.). Each frame of the video stream comprises a two-dimensional array of pixels.

Each pixel of the two-dimensional array of each frame has a color intensity. In one embodiment, the color intensity is RGB-based such that the color intensity is a combination of a color intensity of red, a color intensity of green, and a color intensity of blue. In one embodiment, the color intensity is based on shades of gray. Since the spectrum of shades of gray is a subset of the spectrum of RGB, use of "color, "color intensity", etc. is applicable to both RGB and shades of gray.

Step 12 processes a current frame, which may be any frame of the video stream after the first frame. Step 12 analyzes the current frame and a set of frames preceding the current frame in the video sequence, using a background subtraction algorithm on the set of frames to determine, inter alia, a background image, a foreground mask, one or more static regions, and a static region mask associated with each static region of the one or more static regions. The set of frames consists of one or more frames occurring prior to the current frame.

The background image comprises the two-dimensional array of pixels and a background model of the at least one frame prior to the current frame and does not comprise any moving object. Thus, the background image represents a portion of an image that has been static for a period of time. For example, the background image may include a parking lot and cars that have been therein for a period of time, wherein the period of time may be defined by a user.

Foreground refers to a portion of an image that is changing over the period of time and thus comprises one or more moving objects. For example, the foreground may comprise cars being driven in a parking lot. A foreground mask is a binary representation (e.g., 0 or 1) of a foreground, wherein "1" denotes pixels on a frame containing foreground content consisting of moving object content and "0" denotes pixels of the frame not including foreground content.

A static region comprises a contiguous distribution of pixels that is in a spatially fixed region of a frame. A static object represented by a static region is an abandoned object or a removed object. An abandoned object represented by a static region in a given frame is an object that physically exists in the static region in the given frame, but does not physically exist in the static region in frames preceding the given frame (e.g., a recently parked car in a parking lot). A removed object represented by a static region in a given frame is an object that does not physically exist in the static region in the given frame, but does physically exist in static region in frames preceding the given frame (e.g., a car recently driven out of a parking lot).

A static region mask for each static region is a binary representation (e.g., 0 or 1), wherein a pixel comprising "1" denotes that the pixel is in the static region and pixel comprising "0" denote pixels outside of the static region. Thus, a static region mask superimposed on a frame identifies the pixels in the frame that define the static region in the frame that is associated with the static mask.

The analysis performed in the background subtraction of step 12 determines an existence of a static object, which is either: (1) an abandoned object existing in the static region of the current frame and not existing in the static region of the background image; or (2) a removed object existing in the static region of the background image and not existing in the static region of the current frame.

There are various background subtraction processes known in the art and any known currently or subsequently known background subtraction process may be used to implement step 12. One such background subtraction process that may be beneficially employed is a "mixture of Gaussians" algorithm (see paper Ying-Li Tian, Max Lu, and Arun Hampapur, "Robust and Efficient Foreground Analysis for Real-time Video Surveillance," IEEE CVPR, San Diego. June, 2005) to generate the background model, the foreground image, and static regions.

The mixture of Gaussian algorithm utilizes K Gaussian functions coupled together in a linear combination by Gaussian weight coefficients to define a pixel color intensity probability function. In one embodiment, K is in a range of 3 to 5. The conventional mixture of Gaussian algorithm uses a single weight threshold that provides a lower bound for a sum of the Gaussian weight coefficients for identifying foreground and static regions. If the threshold has a high value, its categorization would result in fragmented foreground or static regions.

Therefore, the present invention provides a novel improvement to the conventional mixture of Gaussian algorithm by using two weight thresholds: a high value weight threshold to identify foreground and a low value weight threshold to identify static regions. The two weight thresholds ensures that a static region is not unnecessarily fragmented due to a high threshold value. In particular, the background subtraction constrains a sum of the Gaussian weight coefficients for identifying the foreground image to exceed the high weight threshold and constrains a sum of the Gaussian coupling coefficients for identifying the static region to exceed a low weight threshold. The high weight threshold is sufficiently high and the low weight threshold is sufficiently low to ensure that the foreground image is adequately identified and the static region is not excessively fragmented.

A novel improvement of the present invention in application to background subtraction is the use of timestamps to select the set of frames occurring prior to the current frame. Conventional background subtraction methods update the background image based on input of specified frames and a predefined update rate parameter. In the present invention, the background image may be updated at different speeds for video streams having different frame rates, even though the update rate parameter is constant. In real-time surveillance systems, the video frame rate often changes dramatically even for the same camera view due to multiple engines running on one machine and the complexity of the scenario. Thus in one embodiment, use of the mixture of Gaussians method in application to the present invention comprises: receiving an input of time data prescribing at least one timestamp; and determining at least one frame occurring prior to the current frame by selecting, for each timestamp of the at least one timestamp, a frame whose frame time is closest to the time of each timestamp. The at least one timestamp may consist of one timestamp or a plurality of timestamps. The at least one frame occurring prior to the current frame determined in the preceding manner is used to generate or update the background image.

Step 13 determines a status of the static object associated with the static region identified in step 12. The status of the static object is an abandoned status if the static object is an abandoned object or a removed status if the static object is a removed object. Step 13 determines the status of the static object by executing an abandoned/removed algorithm (hereinafter, "A/R algorithm") that uses a current frame, the background image, and the static region as input and does not use any other information derived from the background subtraction as input. Implementation of the A/R algorithm is described in detail infra in FIG. 2.

Step 14 stores the status of the static object, as determined in step 13, in a data storage medium of a computer system (e.g., the computer system 90 depicted in FIG. 18) and/or provides the determined status of the static object to an output device of the computer system, such as a data storage device, a display device, etc.

Noting that the current frame will serve as a reference frame for implementing step 16 subsequently, step 14 also stores (as the time of the reference frame) the time of the current frame ($T_{RF}$), in the data storage medium of the computer system. Alternatively, the time ($T_{RF}$) could be stored in the data storage medium in any step preceding step 14 at which the current frame is being processed.

Step 14 also stores the static region of the current frame (i.e., the reference frame), because the static region of the reference frame serves as a template against which the static region in frames appearing after the reference frame are compared as will be discussed infra.

Figure 14:
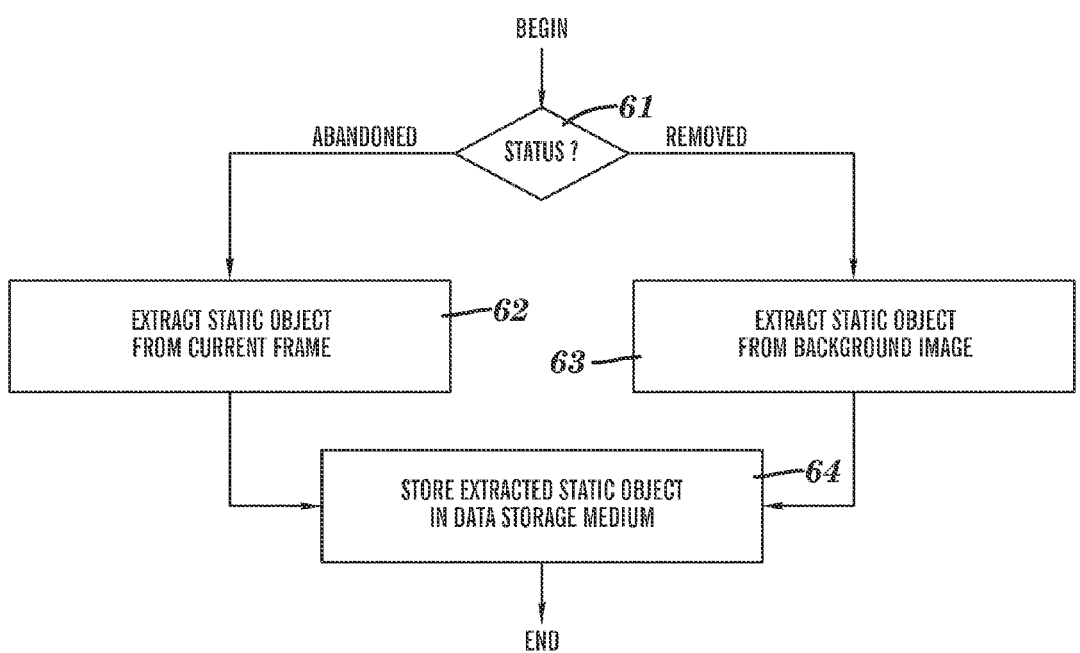
FIG. 14 is a flow chart depicting storing the static object in a data storage medium of the computer system, in accordance with embodiments of the present invention.

Step 14 also stores the static object in the data storage medium of the computer system as described infra in conjunction with FIG. 14.

Step 15, which is performed after step 14, obtains the static object from the data storage medium (into which the static object was stored in step 14) and heals the obtained static object into the background image to create an image of the healed background. Healing the static object into the background image comprises replacing the color intensity of the pixels of the static region in the background image by the color intensity of the respective pixels of the obtained static object. Thus, upon completion of the preceding healing process, the static object becomes part of the background model.

Step 16 determines that requirements necessary for triggering an alarm in conjunction with the static object are satisfied. The requirements may include an object feature requirement, a persistence requirement, a non-persistence duration requirement, and a persistence duration requirement, as described infra in conjunction with FIGS. 15-17.

Step 17 triggers an alarm in response to requirements of step 16 having been satisfied. The alarm may be embodied in any manner that alerts one or more individuals having a need to know that the requirements have been satisfied such as, inter alia, an alarm in a security office, an automatic phone call/electronic message to security personnel patrolling in a vicinity of a local area being monitored by a video camera capturing the video stream being processed, an email message to the one or more individuals having the need to know, etc.

Alternatively or additionally, the alarm may be triggered in the computer system processing the method of the present invention (e.g., computer system 90 of FIG. 18) such as by, inter alia, displaying a visual image or message on a display screen of the computer system, sounding an audio alert via a speaker of the computer system, setting a flag, generating a file, calling a subprogram, etc. that activates further processing by the computer system in response to the alarm, etc.

Figure 2:
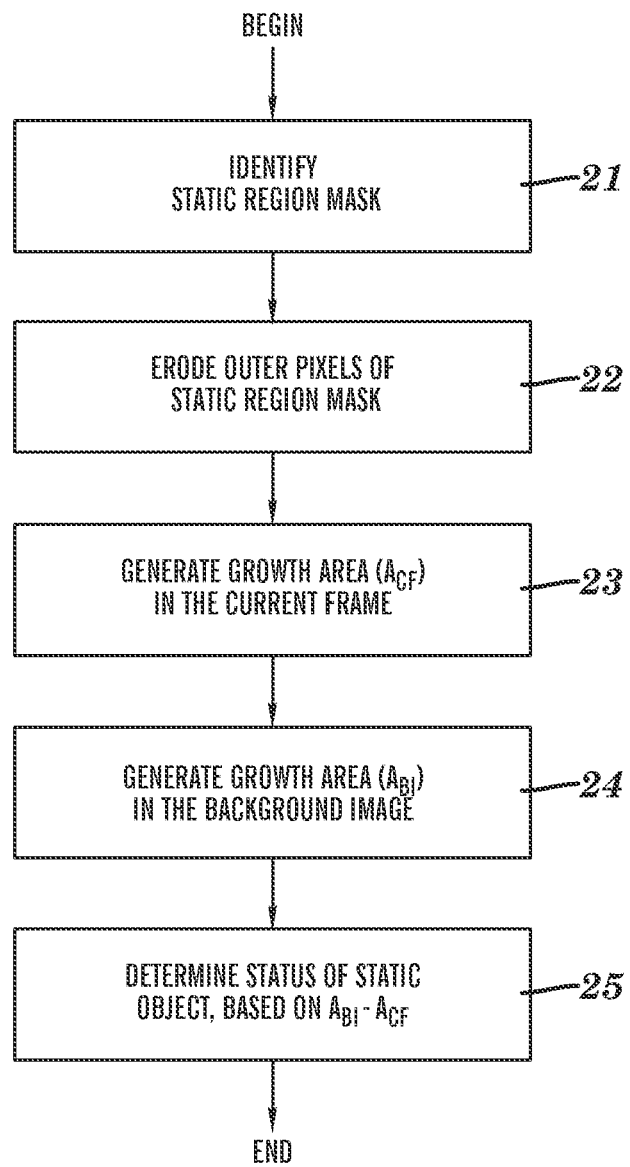
FIG. 2 is a flow chart depicting implementation of the Abandoned/Removed object detection algorithm (A/R algorithm) of FIG. 1, including performing a region growing procedure for both a current frame and a background image of the video stream, in accordance with embodiments of the present invention.

FIG. 2 is a flow chart depicting implementation of the A/R algorithm of step 13 of FIG. 1, in accordance with embodiments of the present invention. FIG. 2 depicts steps 21-25.

Step 21 identifies a static region mask resulting from the background subtraction of step 12 of FIG. 1.

Step 22 erodes outer pixels of the static region mask identified in step 21, leaving remaining non-eroded pixels of the static region mask, wherein boundary pixels of the non-eroded pixels consist of all non-eroded pixels directly exposed to at least one eroded pixel. The boundary pixels are bounded by a contour that serves as in interfacial boundary between the boundary pixels and the eroded pixels.

Figure 3:
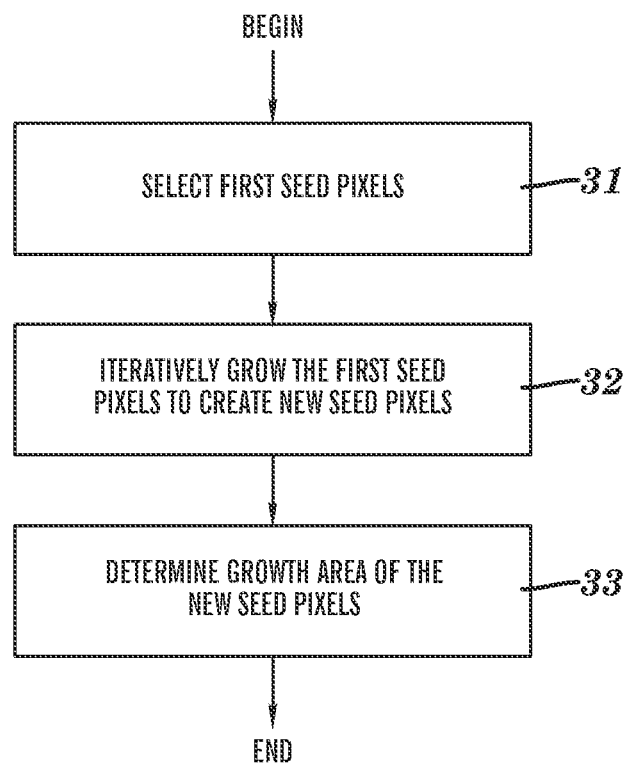
FIG. 3 is a flow chart depicting implementation of the region growing procedure of FIG. 2, in accordance with embodiments of the present invention.

Step 23 generates a growth area ($A_{CF}$) in the current frame via execution of an region growing procedure described infra in conjunction with FIG. 3 which utilizes the non-eroded pixels resulting from step 22.

Step 24 generates a growth area ($A_{BI}$) in the background image via execution of the region growing procedure of FIG. 3 which utilizes the non-eroded pixels resulting from step 22.

Step 25 determines the status of the static object, based on $A_{BI}-A_{CF}$.

In one embodiment wherein $\delta A_{th} \geq 0$ denotes a specified area difference threshold, step 23 determines that: (1) $A_{BI}-A_{CF} > \delta A_{th}$ which means that the status is the abandoned status; (2) $A_{CF}-A_{BI} > \delta A_{th}$ which means that the status is the removed status; or (3) $|A_{BI}-A_{CF}| \leq \delta A_{th}$ which means that the status is indefinite.

In one embodiment, the preceding test using the area difference threshold is replaced by a test using a fractional threshold $\epsilon \geq 0$, wherein step 23 determines that: (1) $(A_{BI}-A_{CF})/(A_{BI}+A_{CF}) > \epsilon$ which means that the status is the abandoned status; (2) $(A_{CF}-A_{BI})/(A_{BI}+A_{CF}) > \epsilon$ which means that the status is the removed status; or (3) $|(A_{BI}-A_{CF})|/(A_{BI}+A_{CF}) \leq \epsilon$ which means that the status is indefinite.

Whenever the discussion infra of the present invention discusses the test involving $\delta A_{th}$, it should be understood that the aforementioned test involving $\epsilon$ could alternatively be utilized.

FIG. 3 is a flow chart depicting implementation of the region growing procedure used in steps 23 and 24 of FIG. 2, in accordance with embodiments of the present invention. FIG. 3 generates and outputs a growth area in an input frame supplied by a step that calls the region growing procedure. In particular, step 21 of FIG. 2 supplies the current frame to be used as the input frame by the region growing procedure, and step 22 of FIG. 2 supplies the background image to be used as the input frame by the region growing procedure. The static region is additional input to the region growing procedure. In addition, the region growing procedure may utilize a specified pixel erosion depth and seed selection parameters.

FIG. 3 depicts steps 31-33 will be described in application of the region growing procedure to an example illustrated in FIGS. 4-13.

Step 31 selects first seed pixels from the boundary pixels of the non-eroded pixels resulting from step 22 of FIG. 2 after the bounding contour and boundary pixels resulting from step 22 has been superimposed on the frame to align the non-eroded pixels determined in step 22 with the corresponding pixels of the frame. In this embodiment, the first seed pixels are independently selected for the current frame and background image, which enables the current frame and background image to select different first pixel seeds to beneficially exploit different color intensity spatial patterns in the current frame and background image. In this embodiment, the first seed pixels may be selected: first for the current frame and subsequently for the background image; first for the background image and subsequently for the current frame; or concurrently for the current frame and the background image (e.g., if parallel processing hardware is being used).

Alternatively, the first seed pixels for the frame presently being processed (e.g., the background image) may be selected in step 31 to consist of previously selected first seed pixels from a prior execution of step 31 for another frame (e.g., the current frame) using the same boundary pixels and contour as is being used in the execution of step 31 for the frame presently being processed. In this embodiment, the selected first seed pixels are the same first see pixels for the current frame and background image, which reduces the computational cost of selecting the first pixel seeds for the current frame and background image. In this embodiment, the first seed pixels may be selected first for the current frame and subsequently for the background image, or first for the background image and subsequently for the current frame, but cannot be selected concurrently for the current frame and the background image.

Step 32 iteratively grows the first seed pixels outside the non-eroded pixels to create new seed pixels at neighbor pixels of the first seed pixels, at those neighbor pixels whose color intensity matches the color intensity of the first seed pixels according to a specified color matching criterion. Said iteratively growing creates new seed pixels at the neighbor pixels in successive generations of new seed pixel creation until additional new seed pixels cannot be created.

Step 33 determines the output growth area as a composite area of the new seed pixels.

FIGS. 4-8 and 9-13 illustrate application of the static region mask eroding step 22 of FIG. 2 in conjunction with the region growing procedure of FIG. 3 to a first input frame and to a second input frame, respectively, in accordance with embodiments of the present invention.

In the following example in which a static object that is detected is an abandoned object, the first input frame in FIGS. 4-8 is the current frame 40 and the second input frame in FIGS. 9-13 is the background image 50.

Figure 4:
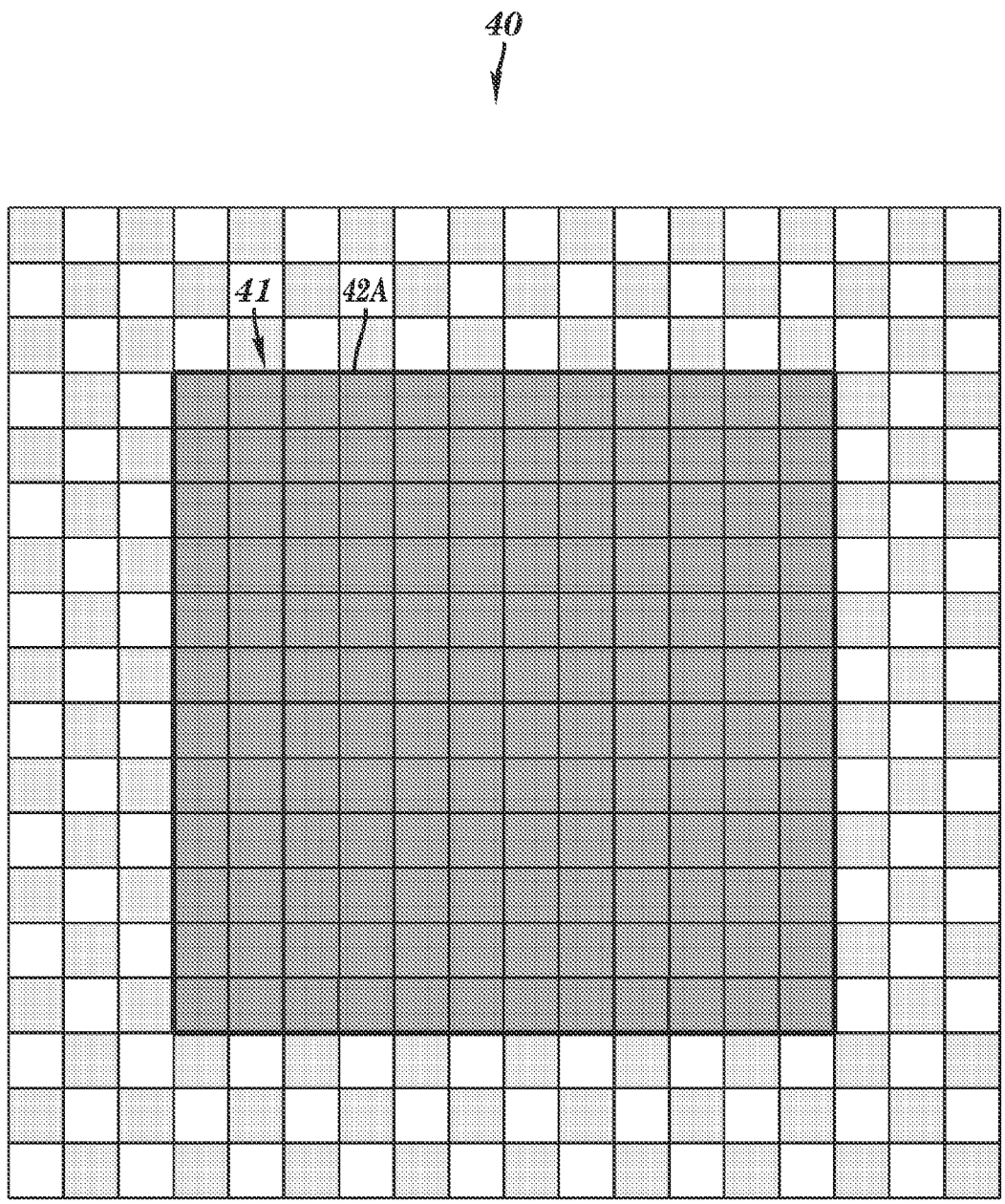
FIGS. 4-8 and 9-13 illustrate application of the region growing procedure of FIG. 3 to a first input frame and to a second input frame, respectively, in accordance with embodiments of the present invention.

In FIG. 4, the static region 41 having an outer boundary 42A in the current frame 40 is identified from step 21 of FIG. 2.

Figure 5:
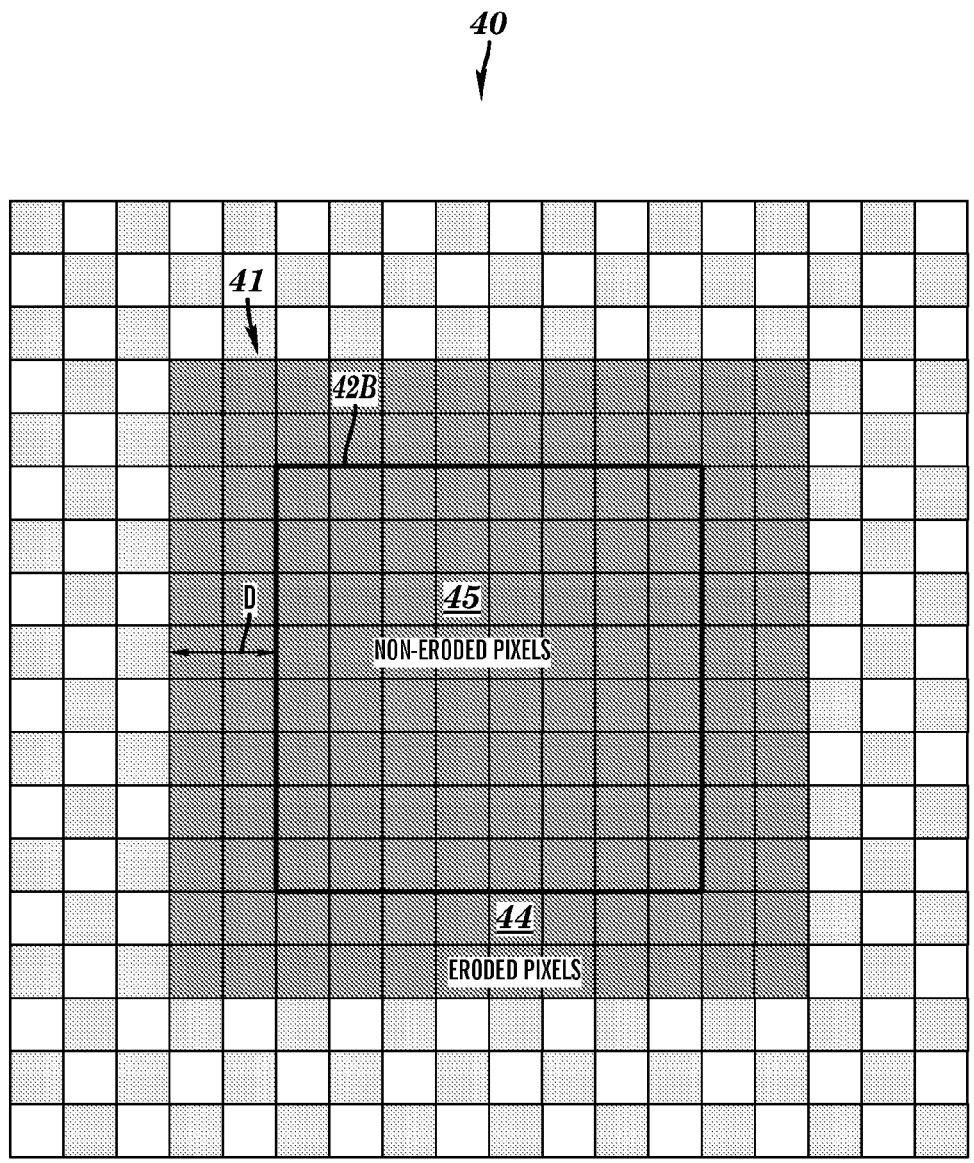

FIG. 5 depicts the result of an erosion process implemented by step 22 of FIG. 2, wherein outer pixels of the static region 41 of FIG. 4 have been eroded and are referred to as eroded pixels 44, leaving remaining non-eroded pixels 45 of the static region 41. The erosion process does not change the static region 41, but rather moves the outer boundary 42A of FIG. 4 inward within the static region 41 to become a contour 42B that is disposed totally within the static region 41 and bounds the non-eroded pixels 45. Boundary pixels 46 (see FIG. 6) of the non-eroded pixels 45 consist of all non-eroded pixels directly exposed to at least one eroded pixel 44.

In one embodiment, the process of moving boundary 42A of FIG. 4 inward within the static region 41 to become the contour 42B may be accomplished by circumferentially eroding outer pixels of the static region 41 to a pixel erosion depth D expressed as a number of pixel layers to be eroded. A pixel erosion depth D of 2 is used in the present example to generate contour 42B through an inward movement of the boundary 42A by 2 pixels.

In one embodiment, the value of the pixel erosion depth is constrained to ensure a sufficient number of boundary pixels in step 32 of FIG. 3. In other words, if the static object has a too small number of pixels, an excessively large pixel erosion depth will result in too few first seed pixels to iteratively grow sufficiently to calculate $A_{CF}$ with sufficient accuracy to satisfy $|A_{BI}-A_{CF}| > \delta A_{th}$ and similar threshold tests discussed supra.

Figure 6:
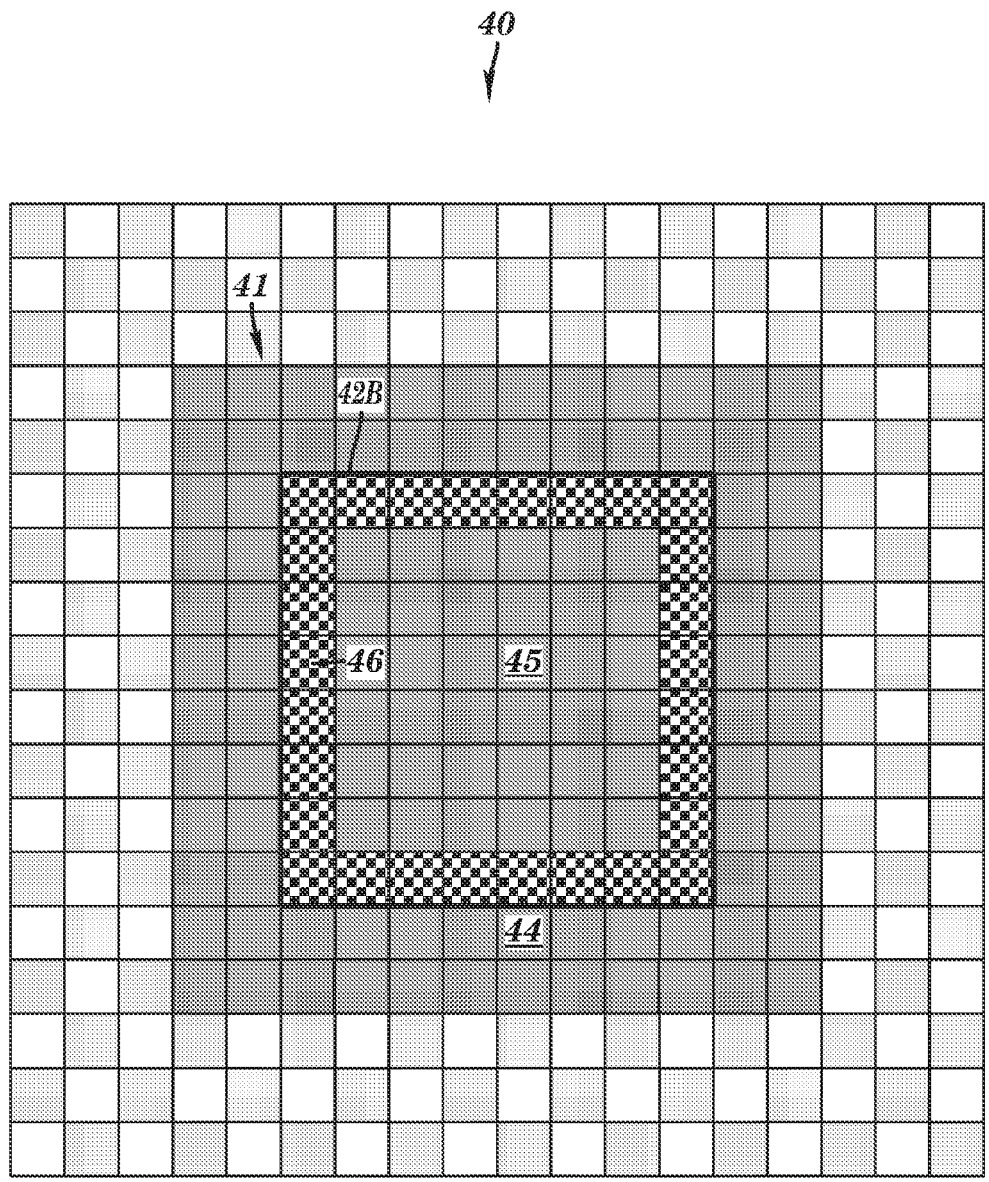

FIG. 6 depicts FIG. 5 with the 28 boundary pixels 46 of the non-eroded pixels 45 being specifically marked.

Figure 7:
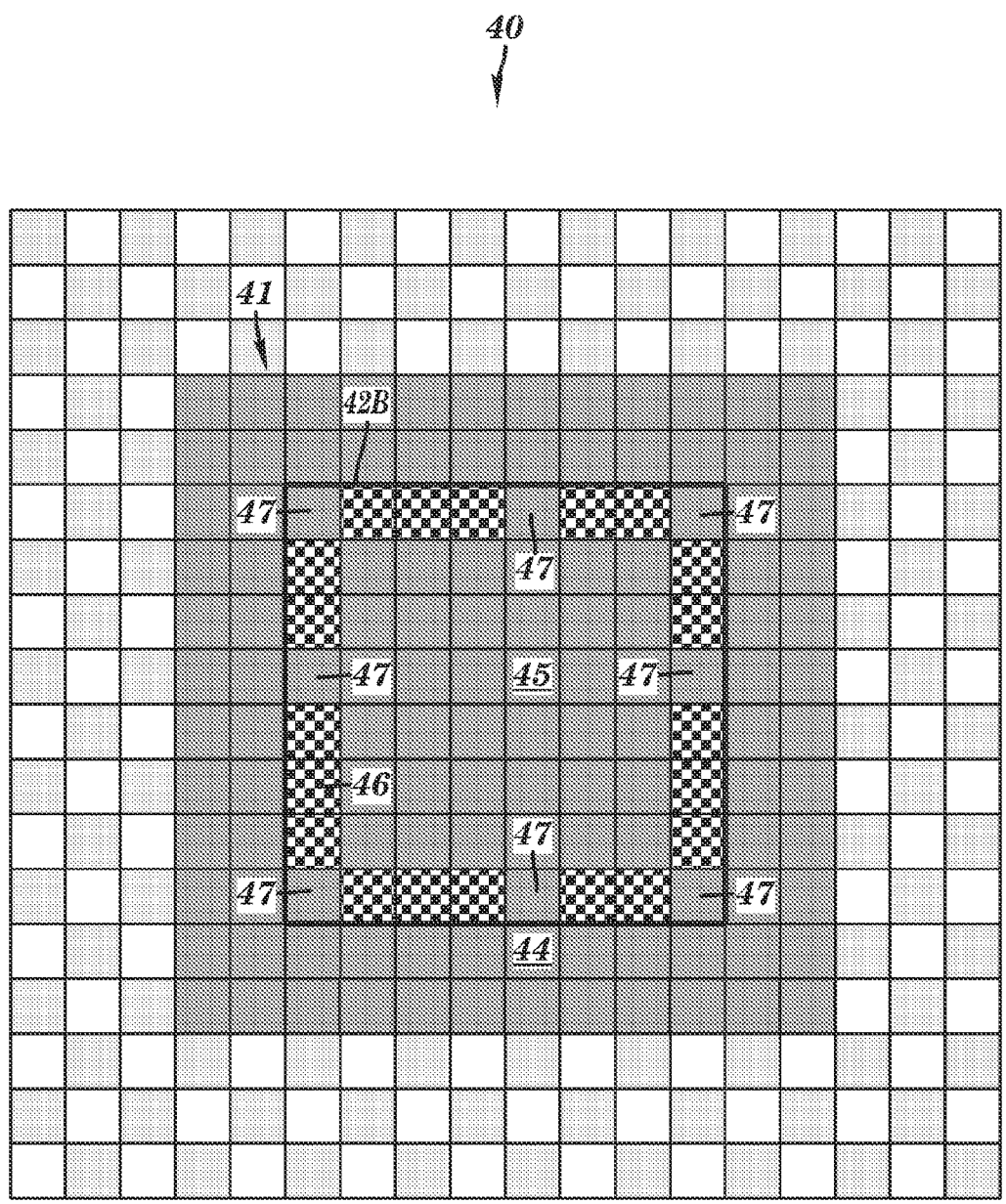

FIG. 7 depicts first seed pixels 47 that have been selected from the boundary pixels 46 in step 31 of FIG. 3. In one embodiment, the selected first seed pixels consist of all boundary pixels (e.g., all 28 boundary pixels 46 depicted in FIG. 6). In one embodiment, the selected first seeds consist of fewer pixels than the total number of boundary pixels, as in FIG. 7 which depicts 8 first seed pixels 47 that were selected from the 28 boundary pixels 46. In one embodiment, the first seed pixels 47 may be about uniformly distributed within the boundary pixels 46 as in FIG. 7. In one embodiment, the first seed pixels 47 may be non-uniformly distributed within the boundary pixels.

In one embodiment, the first seed pixels 47 may be selected to be color mismatched with at least one boundary pixel that is a neighbor pixel thereof. Color matching (or mismatching) is in accordance with a color matching criterion. A "neighbor pixel" to a given pixel is a pixel that directly touches the given pixel anywhere at the given pixel, even if only at a single point of the given pixel.

The preceding embodiment may be implemented by selecting one boundary pixel as a first seed pixel, either at a randomly selected boundary pixel or at a specifically selected boundary pixel. From this one boundary pixel, the procedure moves systematically (e.g., clockwise or counterclockwise) to the neighbor boundary pixels of this one boundary pixel in succession and tests for a color mismatch with each neighbor boundary pixel until a color mismatch is detected. If there is a color match with a neighbor boundary pixel, then the color-matched neighbor boundary pixel is not selected as a first seed pixel. If there is a color mismatch with a neighbor boundary pixel, then the color-mismatched neighbor boundary pixel is selected as the next first seed pixel. From this next first seed pixel, the procedure moves systematically to the next neighbor boundary pixels in succession and performs the preceding tests for color mismatch, until all boundary pixels have been processed in the preceding manner. For example, if the boundary pixels consist of successive boundary pixels P1 (blue), P2 (blue), P3 (red), P4 (red), P5 (red), P6 (red), P7 (green), P8 (green), and if the selected first seed pixel is P1, then the selected first seed pixels are P1, P3 and P7. This embodiment is efficient for selecting first seed pixels to reduce computation cost.

In one embodiment, a color matching criterion is that a first pixel and a second pixel are color matched if their respective color intensities fall within a same range of color intensities that has been specified as a "color class". A color class consists of a specified set of discrete colors. The totality of color classes encompasses all possible color intensities in the color spectrum being used, and each color class consists of a subset of said all possible color intensities. Thus, the first pixel and the second pixel are color matched according to the preceding color matching criterion if their respective color intensities fall within a same color class. The first pixel and the second pixel are color mismatched if their respective color intensities do not fall within a same color class. Therefore, any two pixels are either color matched or color mismatched. From another point of view, the first pixel and the second pixel are color matched according to the preceding color matching criterion if their respective color intensities fall within a same color class.

Figure 8:
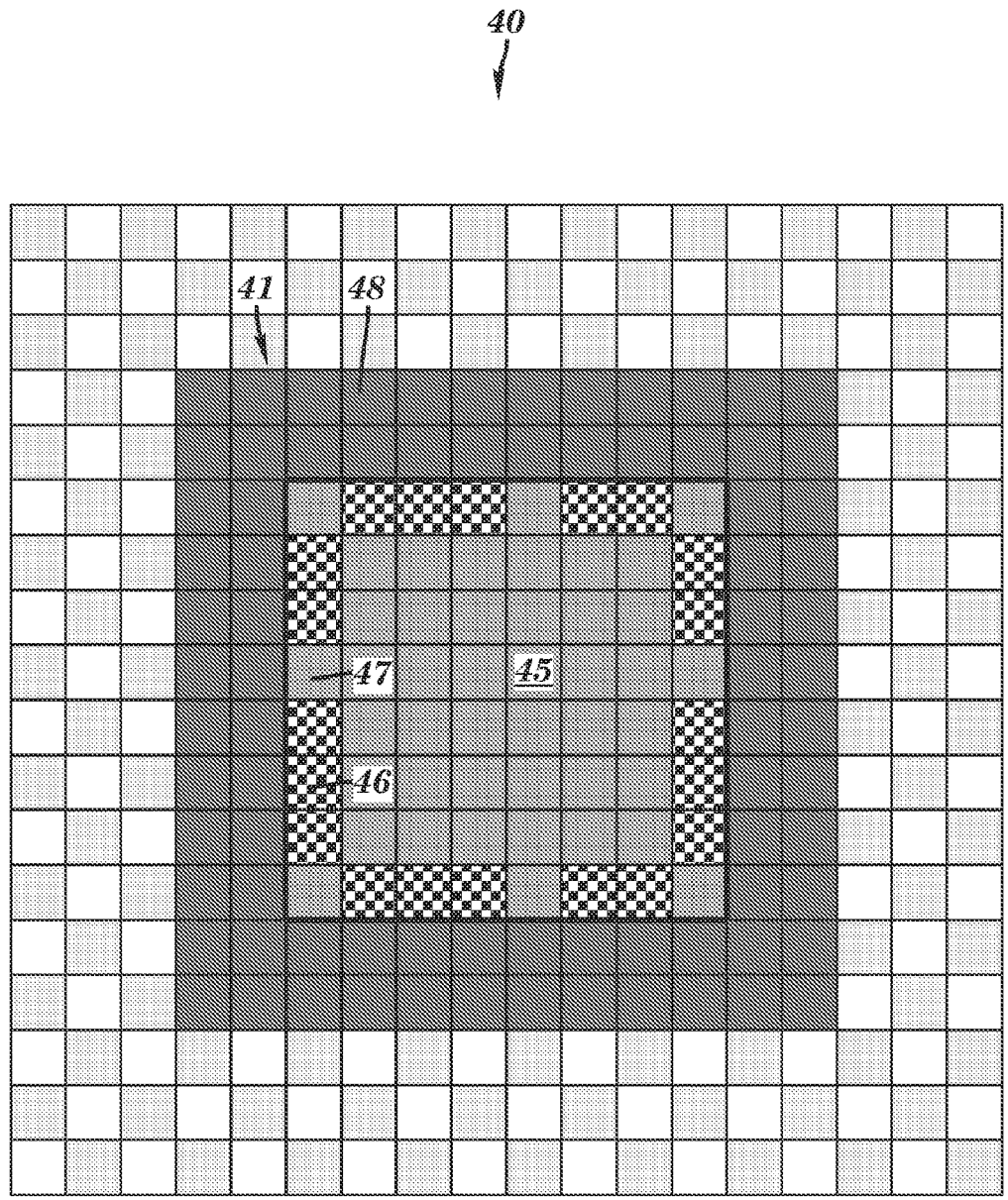

FIG. 8 depicts the result of step 32 of FIG. 3 of iterative growth of the first seed pixels 47 outside the non-eroded pixels 45 to create new seed pixels at neighbor pixels thereof whose color intensity matches the color intensity of the first seed pixels according to a specified color matching criterion. Each neighbor pixel that has been color matched with a first seed pixel becomes a new seed pixel and is subsequently color matched with its neighbor pixels according to the specified color matching criterion. This process continues to iteratively create new seed pixels until additional new seed pixels cannot be created, resulting in a growth region 48 whose associated growth area $A_{CF}$ is computed in step 33 of FIG. 3 by adding the areas of the individual new seed pixels. If the area of each pixel is 1, then $A_{CF}$=80 for growth region 48 in FIG. 7.

Figure 9:
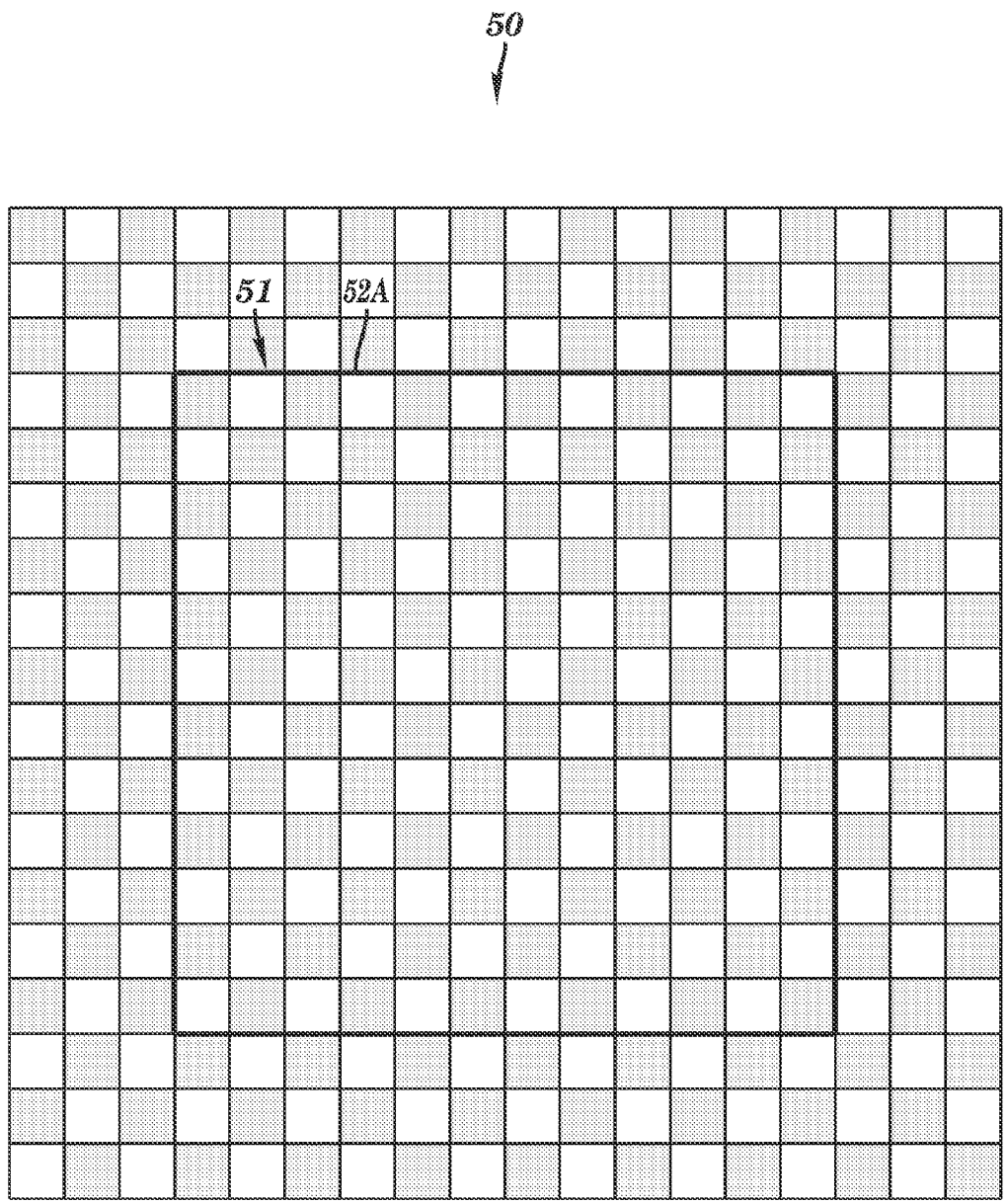

In FIG. 9, the static region 51 having an outer boundary 52A in the background image 50 is identified from step 21 of FIG. 2.

Figure 10:
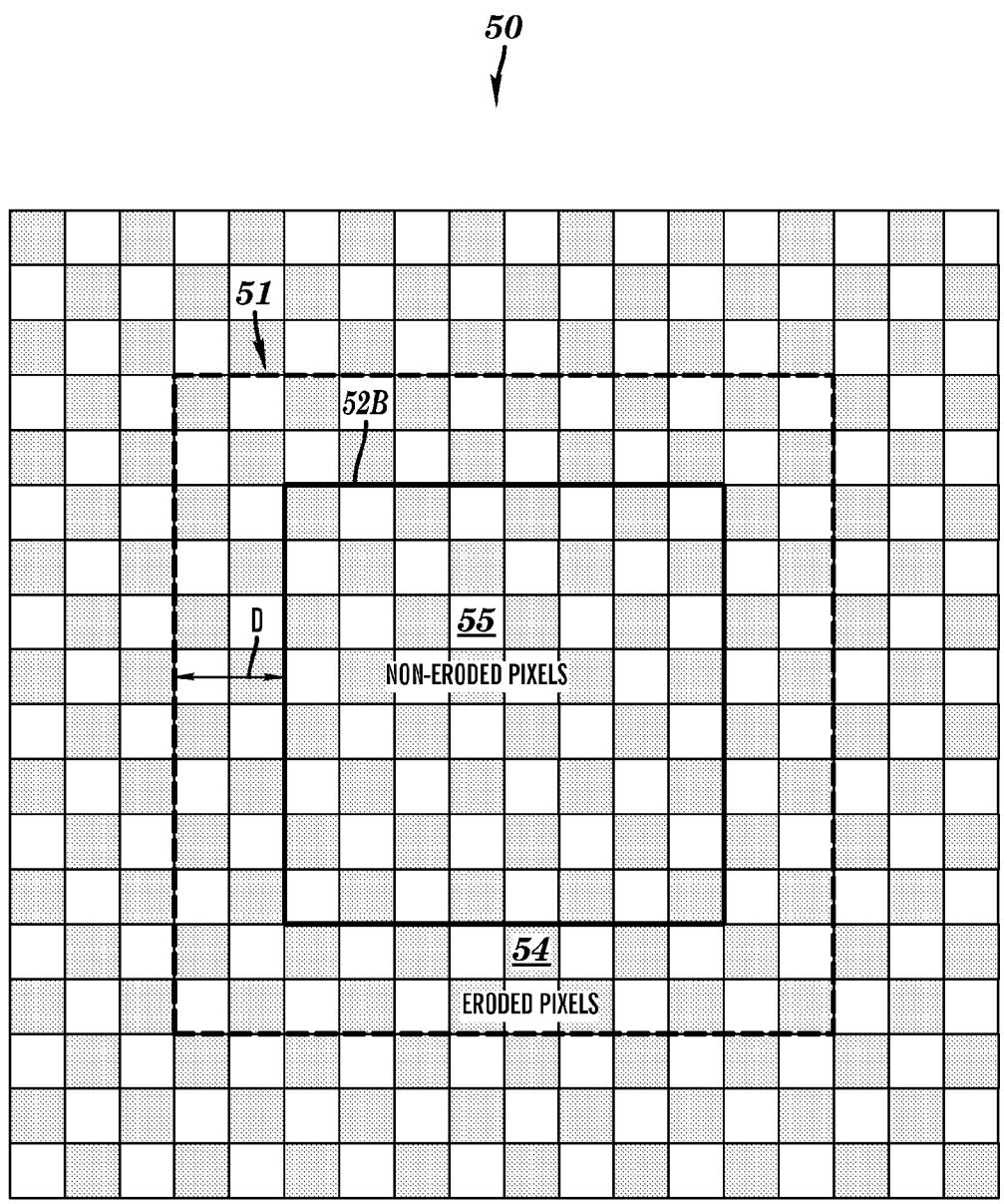

FIG. 10 depicts the result of an erosion process implemented by step 22 of FIG. 2, wherein outer pixels of the static region 51 of FIG. 4 have been eroded and are referred to as eroded pixels 54, leaving remaining non-eroded pixels 55 of the static region 51. The erosion process does not change the static region 51, but rather moves the outer boundary 52A of FIG. 9 inward within the static region 51 to become a contour 52B that is disposed totally within the static region 51 and bounds the non-eroded pixels 55. The contour 52B in FIG. 10 and the contour 42B of FIG. 5 are geometrically congruent with respect to each other and are disposed in the same relative spatial locations in the current frame 10 and the background image 40, respectively, because the same step 22 of FIG. 2 was used to generate a contour that is used for both the contours 42B and the contour 52B. Boundary pixels 56 (see FIG. 11) of the non-eroded pixels 55 consist of all non-eroded pixels directly exposed to at least one eroded pixel 54.

In one embodiment, the process of moving boundary 52A of FIG. 9 inward within the static region 51 to become the contour 52B may be accomplished by circumferentially eroding outer pixels of the static region 51 to a pixel erosion depth D expressed as a number of pixel layers to be eroded. A pixel erosion depth D of 2 is used in the present example to generate contour 52B through an inward movement of the boundary 52A by 2 pixels.

In one embodiment, the pixel erosion depth is constrained to be sufficiently large to ensure the condition that $|A_{BI}-A_{CF}|$ exceeds the specified area difference threshold $\delta A_{th}$, so that the A/R algorithm could lead to an unambiguous determination of the abandoned/removed status of the static object represented by the static region. For example, the preceding condition of $|A_{BI}-A_{CF}|>\delta A_{th}$ may be due to the static object encompassing a very large fraction of the area of the current input frame.

In one embodiment, the pixel erosion depth is constrained to be sufficiently small to ensure a sufficient number of boundary pixels in step 32 of FIG. 3 to avoid induced color growth inhibition during an iterative growing of seed pixels. In other words, if the static object has a too small number of pixels, an excessively large pixel erosion depth will result in too few first seed pixels to iteratively grow sufficiently to calculate $A_{BI}$ with sufficient accuracy to satisfy $|A_{BI}-A_{CF}|>\delta A_{th}$ and similar threshold tests discussed supra.

Figure 11:
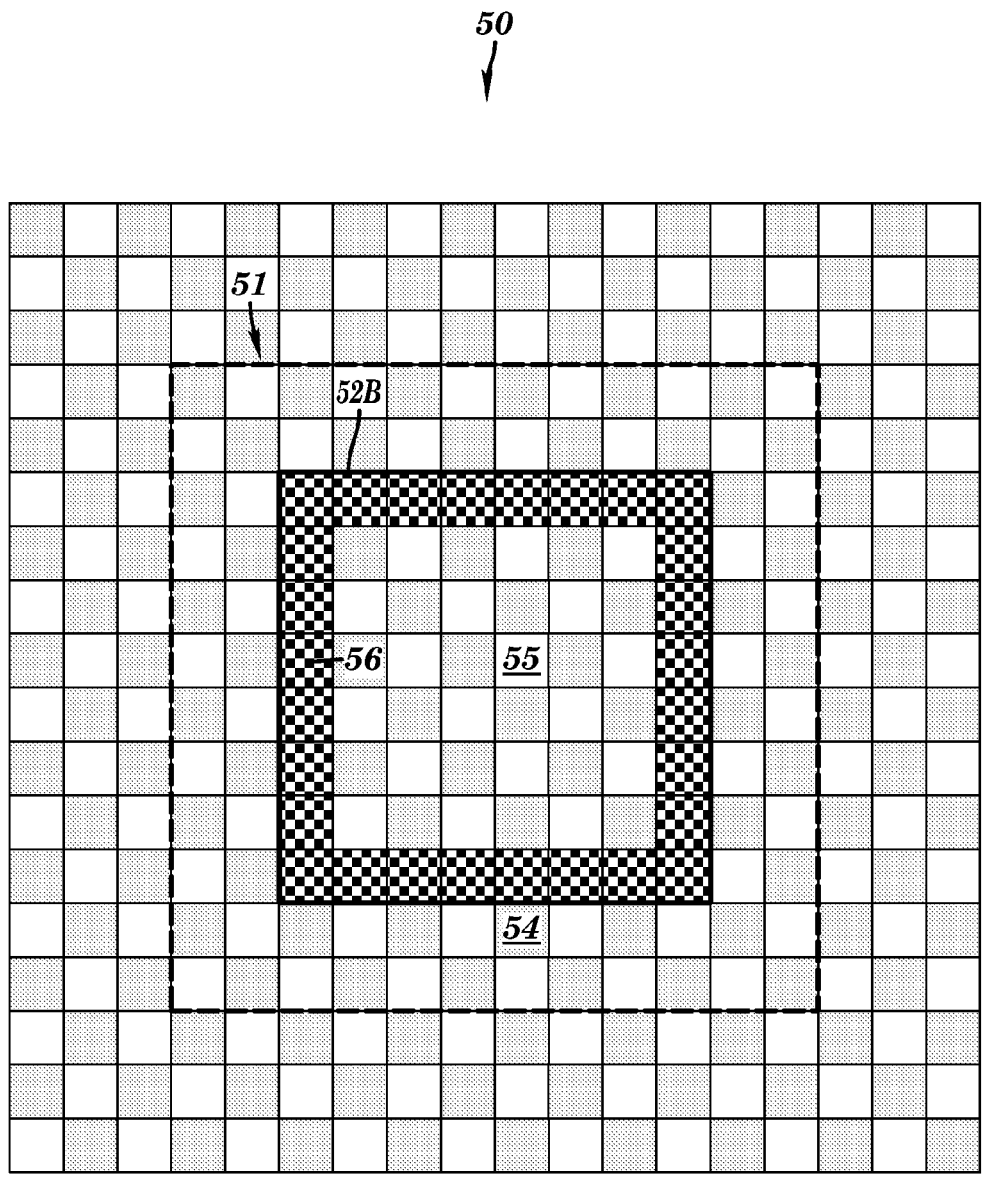

FIG. 11 depicts FIG. 10 with the 28 boundary pixels 56 of the non-eroded pixels 55 being specifically marked.

Figure 12:
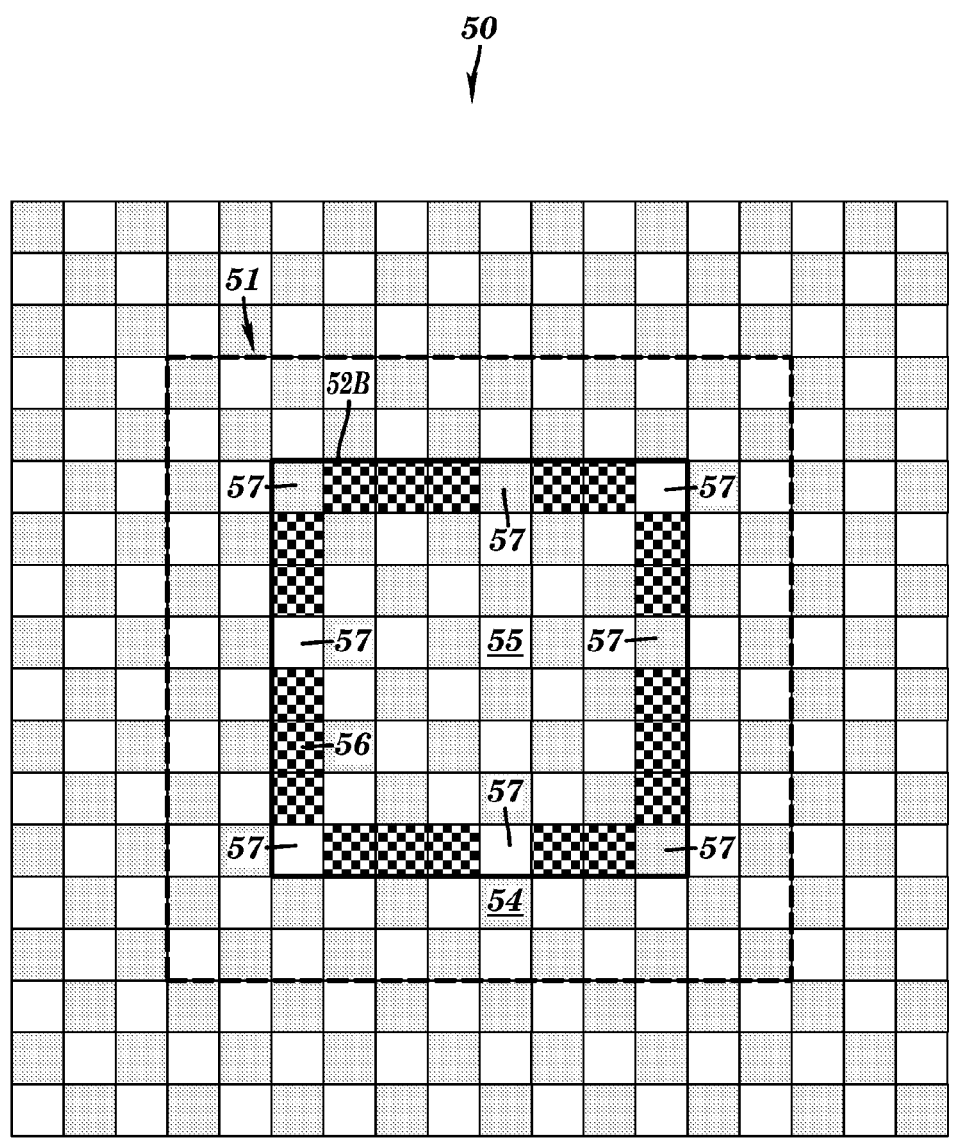

FIG. 12 depicts first seed pixels 57 that have been selected from the boundary pixels 56 in step 31 of FIG. 3 or as the first boundary seeds 47 (see FIG. 7) that were previously selected from the prior execution of the region growing procedure of FIG. 3 for the current frame as described for FIGS. 4-8. In one embodiment, the selected first seed pixels consist of all boundary pixels (e.g., all 28 boundary pixels 56 depicted in FIG. 11). In one embodiment, the selected first seeds consist of fewer pixels than the total number of boundary pixels, as in FIG. 12 which depicts 8 first seed pixels 57 that were selected from the 28 boundary pixels 56. In one embodiment, the first seed pixels 57 may be about uniformly distributed within the boundary pixels 56 as in FIG. 12. In one embodiment, the first seed pixels 57 may be non-uniformly distributed within the boundary pixels.

In one embodiment, the first seed pixels 57 may be selected to be color mismatched with at least one boundary pixel that is a neighbor pixel thereof. Color matching (or mismatching) is in accordance with a color matching criterion. A "neighbor pixel" to a given pixel is a pixel that directly touches the given pixel anywhere at the given pixel, even if only at a single point of the given pixel.

The preceding embodiment may be implemented by selecting one boundary pixel as a first seed pixel, either at a randomly selected boundary pixel or at a specifically selected boundary pixel. From this one boundary pixel, the procedure moves systematically (e.g., clockwise or counterclockwise) to the neighbor boundary pixels of this one boundary pixel in succession and tests for a color mismatch with each neighbor boundary pixel until a color mismatch is detected. If there is a color match with a neighbor boundary pixel, then the color-matched neighbor boundary pixel is not selected as a first seed pixel. If there is a color mismatch with a neighbor boundary pixel, then the color-mismatched neighbor boundary pixel is selected as the next first seed pixel. From this next first seed pixel, the procedure moves systematically to the next neighbor boundary pixels in succession and performs the preceding tests for color mismatch, until all boundary pixels have been processed in the preceding manner. For example, if the boundary pixels consist of successive boundary pixels P1 (blue), P2 (blue), P3 (red), P4 (red), P5 (red), P6 (red), P7 (green), P8 (green), and if the selected first seed pixel is P1, then the selected first seed pixels are P1, P3, and P7. This embodiment is efficient for selecting first seed pixels, because achieving a color match of a boundary pixel with an adjacent neighbor seed pixel does not add accuracy to the calculation of $A_{BI}$ and therefore need not result in a first seed pixel selection In one embodiment, a color matching criterion is that a first pixel and a second pixel are color matched if their respective color intensities fall within a same range of color intensities that has been specified as a "color class", as discussed supra in conjunction with FIG. 5.

Figure 13:
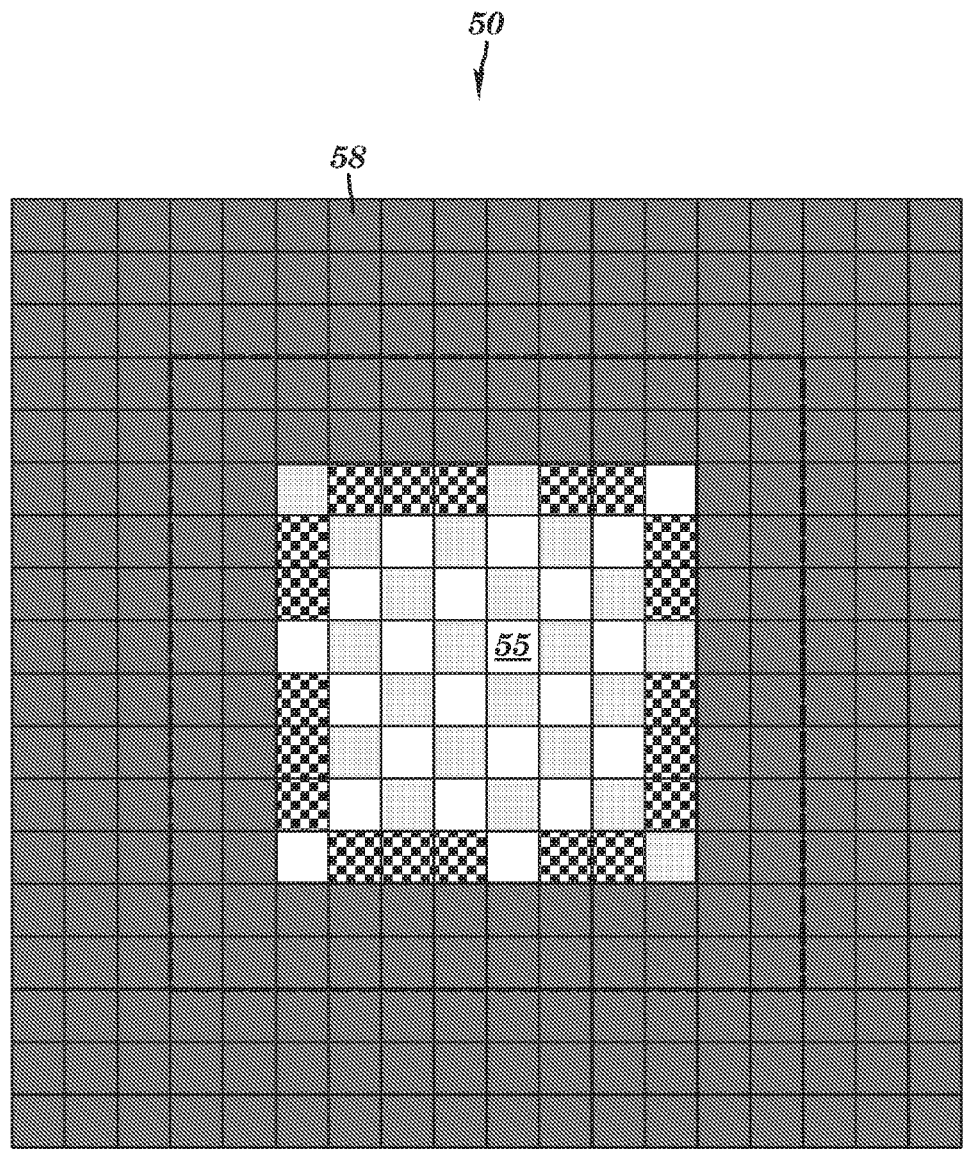

FIG. 13 depicts the result of step 32 of FIG. 3 of iterative growth of the first seed pixels 57 outside the non-eroded pixels 55 to create new seed pixels at neighbor pixels thereof whose color intensity matches the color intensity of the first seed pixels according to a specified color matching criterion. Each neighbor pixel that has been color matched with a first seed pixel becomes a new seed pixel and is subsequently color matched with its neighbor pixels according to the specified color matching criterion. This process continues to iteratively create new seed pixels until additional new seed pixels cannot be created, resulting in a growth region 58 whose associated growth area $A_{BI}$ is computed in step 33 of FIG. 3 by adding the areas of the individual new seed pixels. If the area of each pixel is 1, then $A_{BI}$=260 for growth region 58 in FIG. 13.

The preceding example illustrated in FIGS. 4-13 under the assumption that FIGS. 4-8 represent the current frame and FIGS. 9-13 represent the background image, resulted in $A_{CF}$=80 and $A_{BI}$=260. Since $A_{BI}$-$A_{CF}$=160 (and reasonably assuming that $\delta A_{th}$<160), the A/R algorithm determined that the static object is an abandoned object.

If alternatively FIGS. 4-8 represents the background image and FIGS. 9-13 represents the current frame, a similar analysis of FIGS. 4-13 would yield $A_{BI}$=80 and $A_{CF}$=260, leading to the conclusion that the static object is a removed object.

The preceding example illustrated in FIGS. 4-8 and 9-13 applied the region growing procedure of FIG. 3 independently, and in any order, to the current frame and the background image, respectively, which provides flexibility for tailoring the modeling features the first seed selection step 31 of FIG. 3 to the specific characteristics (especially with respect to the spatial distribution of color intensity) of the current frame and background image, respectively. However, alternative embodiments may be beneficially used.

In a first alternative embodiment, the region growing procedure of FIG. 3 is applied in its entirety to the current frame, followed having the background image utilize the first seed pixels determined for the current frame, which avoids executing the first seed pixel selection step 31 and executes only steps 32-33 in applying the region growing procedure of FIG. 3 to the background image.

In a second alternative embodiment, the region growing procedure of FIG. 3 is applied in its entirety to the background image, followed having the current frame utilize the first seed pixels determined for the background image, which avoids executing the first seed pixel selection step 31 and executes only steps 32-33 in applying the region growing procedure of FIG. 3 to the current frame.

The A/R algorithm of the present invention has been used in a real-time smart video surveillance system. Examples and results demonstrating the effectiveness of the A/R algorithm for abandoned/removed object detection in a variety of environments are presented next.

The A/R algorithm has been used with the Pets 2006 dataset (see PETS 2006 Benchmark Data, http://www.cvg.rd-g.ac.uk/PETS2006/data.html), which was designed to test abandoned object detection algorithms in a public space. The ground truth for the testing sequences include the number of persons and luggage involved in the event, and also spatial relationships between the luggage and person (to check whether the luggage is being attended or not). Persistent foreground objects are classified as abandoned items, without taking into consideration whether the object is being attended by a person or not.

The Pets dataset consists of multi-sensor sequences containing left-luggage scenarios with increasing scene complexity. There are seven different scenarios captured by four cameras from different viewpoints. The A/R algorithm is being used based on a single camera and just one of the camera views in each scenario is used, totaling seven testing sequences. The camera was chosen where the object appears bigger in the video. The whole image region is used to detect the abandoned objects. Table 1 shows obtained results for seven sequences. The scenarios are relatively simple, without many occlusions and crowds. The A/R algorithm detected all abandoned items, with zero false alarms. A static person is detected as an abandoned item in sequence S3. The static person could be removed by incorporating a person classifier.

TABLE 1

Abandoned Object Detection For 7 Pets2006 Sequences.

| # of | abandoned objects | True Positives | Static Person | False Positives |
|---|---|---|---|---|
| 7 | 7 | 7 | 1 | 0 |

The i-LIDS video library provides a benchmark to facilitate the development and selection of video detection systems (see LIDS Dataset for AVSS 2007, ftp://motinas.elec.qmul.ac.uk/pub/iLids). Evaluation of the method and system of the present invention is based on two scenarios: abandoned baggage and parked vehicles. The abandoned baggage scenario contains alarm events of unattended bags on the platform of an underground station. The parked vehicles scenario contains alarm events of suspiciously parked vehicles in an urban setting. Table 2 and Table 3 show details of the detection results. Unlike previous work in which only small regions are selected to detect the events, the whole camera view was used to detect the abandoned events. In both scenarios, all of the abandoned events (baggage and parked vehicles) were detected with low false positives. Some static people are detected as abandoned items because incorporation of a person classifier was not used. Note that a very small static water bottle is detected.

TABLE 2

Abandoned object detection for iLids dataset abandoned baggage scenario.

| # of sequence | Abandoned objects | True Positives | Static Person | False Positives |
|---|---|---|---|---|
| 5 | 8 | 8 | 9 | 4 |

TABLE 3

Parked vehicle detection for iLids dataset parked vehicle scenario.

| # of sequence | Parked Vehicle | True Positives | False Positives |
|---|---|---|---|
| 5 | 6 | 6 | 1 |

Since both Pets and iLids datasets are for abandoned object detection, a dataset that includes removed object events in different situations (retail stores, parking lot, lab, conference room, etc.) with different sizes and types of the removed objects (a bottle water, book, laptop, car etc.) were recollected. Table 4 shows the detection results. For a total of 12 removed objects, 11 objects were detected. One object is missing because the pixels of the region are randomly updated to the background model, so the region after the object was removed is not detected as a static region. The removed objects include a parked car and a laptop.

TABLE 4

Detection results for removed object detection.

| Removed Objects | True Positives | False Positives |
|---|---|---|
| 12 | 11 | 0 |

FIG. 14 is a flow chart depicting storing the static object in a data storage medium of the computer system to implement an aspect of step 14 of FIG. 1, in accordance with embodiments of the present invention. FIG. 14 depicts steps 61-64.

Step 61 identifies whether the status of the static object determined in step 13 of FIG. 1 is the abandoned status or the removed status.

If step 61 determines that the status of the static object is the abandoned status, then step 62 extracts the static object from the current frame, followed by execution of step 64.

If step 61 determines that the status of the static object is the removed status, then step 63 extracts the static object from the background image, followed by execution of step 64.

Step 64 stores the extracted static object in the data storage medium of the computer system.

Figure 15:
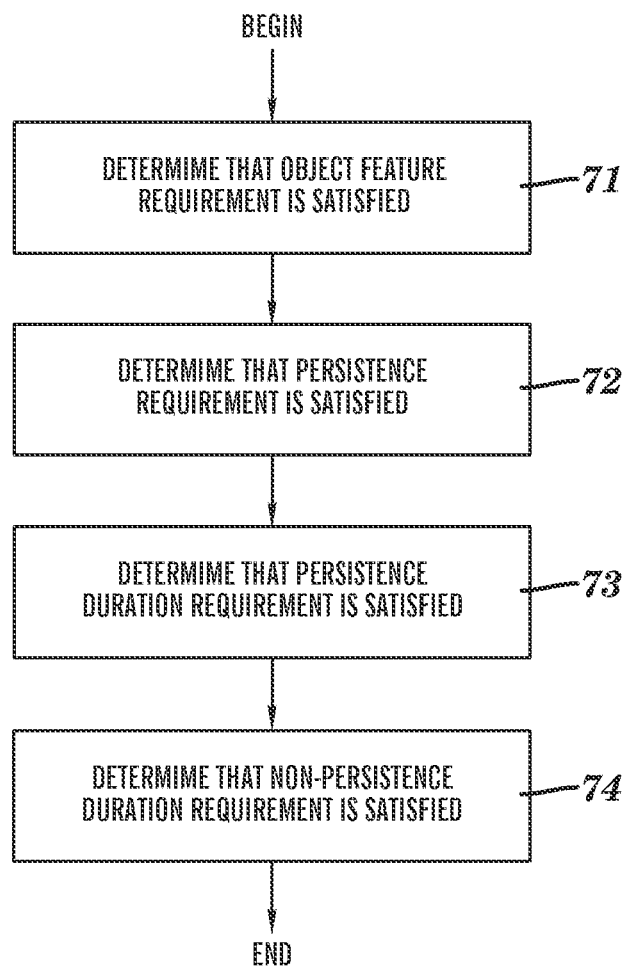
FIG. 15 is a flow chart depicting a process of determining that requirements necessary for triggering an alarm in conjunction with the static object are satisfied, in accordance with embodiments of the present invention.

FIG. 15 is a flow chart depicting a process of determining that requirements necessary for triggering an alarm in conjunction with the static object are satisfied to implement step 16 of FIG. 1, in accordance with embodiments of the present invention. Implementation of FIG. 15, as well as FIGS. 16-17, requires access to the static region of the current frame used in step 13 of FIG. 1 to determine the status of the static object and to the color intensity at the pixels of the static region, which may be obtained from the static region and associated static object stored in the data storage medium in step 14 of FIG. 1. The current frame so accessed will be referred to as a reference frame in the implementation of FIGS. 15-16.

FIG. 15 depicts steps 71-74.

In an embodiment in which step 71 is performed, step 71 determines that an object feature requirement has been satisfied. The object feature requirement is that at each feature of least one feature, the static object satisfies a corresponding feature requirement of at least one feature requirement. The at least one feature requirement may comprise, inter alia, a size feature requirement, a shape feature requirement, a color feature requirement, a location feature requirement, a feature type requirement, etc.

A size feature requirement is that the area occupied by the pixels of the static region representing the static object is required to satisfy an area constraint such as: not exceeding a specified maximum area, not being less than a specified minimum area, or being within a specified range of areas.

A shape requirement is that the pixels of the static region representing the static object are required to form essentially a specified shape (e.g., square, rectangle, circle, ellipse, triangle, polygon, etc.).

A color feature requirement is that a measure of a difference ($M_{DIFF}$) between a color intensity distribution of the static object and a specified characteristic color intensity distribution is less than a specified color intensity difference tolerance. In one embodiment, a measure of the difference ($M_{DIFF}$) is indicated in Equations (1).

$$M_{DIFF} = [(\Sigma_i (I_{OBJ,i} - I_{CHR,i})^2)/J]^{1/2} \quad (1)$$

wherein $I_{OBJ,i}$ is the color intensity at pixel i of the static object in its static region, $I_{CHR,i}$ is the color intensity at pixel i of the specified characteristic color intensity distribution, J is the total number of pixels in the static object, and $\Sigma_i$ denotes a summation over i from i=1 to i=J.

Note that the measure $M_{DIFF}$ in Equation (1) is only one measure of various alternative measures that may be used to characterize the difference between a color intensity distribution of the static object and a specified characteristic color intensity distribution. For example, a variant of Equation (1) in which the factor $(I_{OBJ,i} - I_{CHR,i})^2$ is multiplied by a pixel-dependent weight ($W_i$) could be used to place relatively more emphasis on some spatial portions of the static object and relatively less emphasis on other spatial portions of the static object.

The static object with its color intensity distribution in its static region may be obtained from the data storage medium into which the static object was stored in step 14 of FIG. 1.

A location requirement is that the pixels of the static region representing the static object are required to be essentially distributed in a frame in accordance with a specified spatial pixel distribution within the frame.

A feature type requirement that the pixel that the object be of a specified type (e.g., a person, a football, an automobile, etc.). This requirement may be tested by using an object classifier to compare the static object with previously stored and continuously self-learning objects stored in an objects library (see paper Lisa M. Brown, "View Independent Vehicle/Person Classification," ACM, VSSN '04, N.Y., Oct. 15, 2004)

Step 72 determines that a persistence requirement has been satisfied, wherein the persistence requirement is that the static region in each frame of a plurality of frames is persistent relative to a reference frame consisting of the current frame at which the status of the static object was determined in step 13 of FIG. 1. The plurality of frames occur during a time interval immediately following a time of occurrence ($T_{RF}$) of the reference frame used to determine the status of the static object in step 13 of FIG. 1 and encompass a cumulative time duration ($T_P$).

Step 73 determines that a non-persistence duration requirement has been satisfied, wherein the non-persistence duration requirement is that for each frame of one or more frames in at least one time period during said time interval, the static region is non-persistent relative to the static region in the reference frame and a cumulative time duration ($T_{NP}$) encompassed by the one or more frames is less than a specified non-persistence duration threshold ($T_1$). Step 73 is illustrated in the examples of FIGS. 16 and 17, discussed infra.

Step 74 determines that a persistence duration requirement has been satisfied, wherein the persistence duration requirement is that a cumulative time duration ($T_{TOT}$) encompassed by said time interval occurs only after the at least one time period (defined in step 73) has elapsed and exceeds a specified persistence duration threshold ($T_2$) characterized by $T_2 > T_1$. Step 73 is illustrated in the examples of FIGS. 16 and 17, discussed infra.

Note that $T_{TOT} = T_P + T_{NP}$. In other words, the total time elapsed after the reference frame ($T_{TOT}$) is a sum of the time of frames whose static region is persistent relative to the static region in the reference frame ($T_P$) and a sum of the time of frames whose static region is non-persistent relative to the static region in the reference frame ($T_{NP}$).

Figure 16:
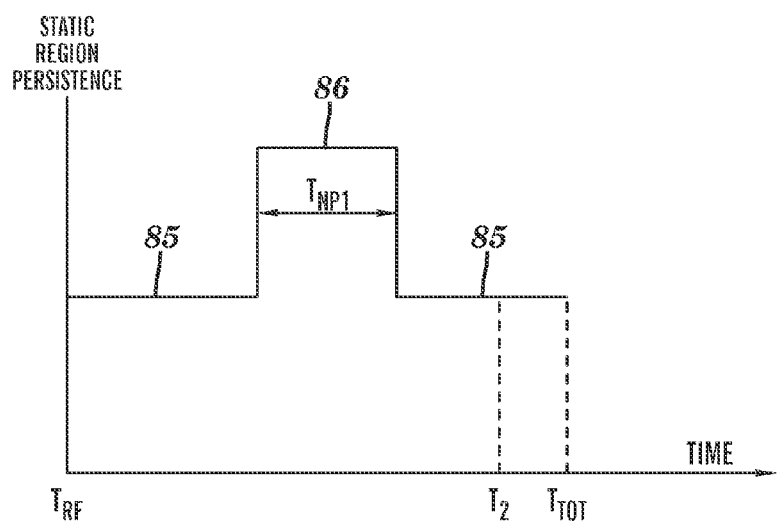
FIGS. 16-17 depict examples of tracking transient persistence of a static region representing the static object, in accordance with embodiments of the present invention.
Figure 17:
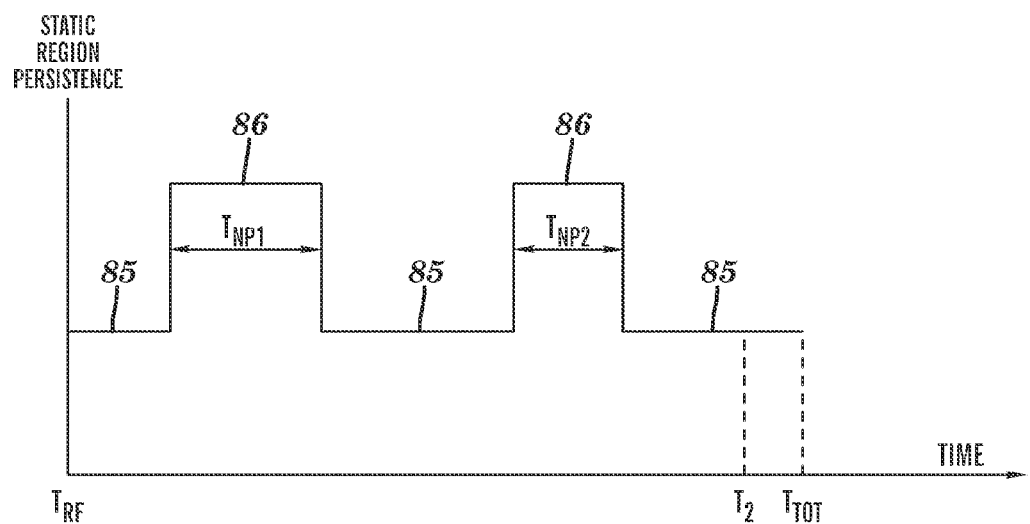

FIGS. 16-17 depict examples of tracking transient persistence of a static region representing the static object, in accordance with embodiments of the present invention.

In FIG. 16, static region persistence of the static region is plotted as a function of the time of the frames immediately following the time $T_{RF}$ of the reference frame. The "static region persistence" is a step function having a persistent value 85 or a non-persistent value 86. The persistent value 85 represents a condition of the static region in each frame of the plurality of frames at its time being persistent relative to the static region in the reference frame. The non-persistent value 86 represents the static region in each frame of the one or more frames at its time being non-persistent relative to the static region in the reference frame.

The static region in any frame is persistent relative to the static region in the reference frame if a measure of a distance ($M_{DIST}$) between the color intensity in the static region in said any frame and the color intensity distribution of the static region in the reference frame is less than a specified color intensity distance tolerance.

The static region in any frame is non-persistent relative to the static region in the reference frame if the measure of the distance ($M_{DIST}$) between the color intensity in the static region in said any frame and the color intensity distribution of the static region in the reference frame is not less than the specified color intensity distance tolerance.

In one embodiment, a measure of the distance ($M_{DIST}$) is indicated in Equations (2).

$$M_{DIST} = [(\Sigma_i (I_{ANY,i} - I_{REF,i})^2)/K]^{1/2} \quad (2)$$

wherein $I_{REF,i}$ is the color intensity at pixel i in the static region in the reference frame, $I_{ANY,i}$ is the color intensity at pixel i in the static region in said any frame at its time, K is the total number of pixels in the static region in the reference frame, and $\Sigma_i$ denotes a summation over i from i=1 to i=K.

Note that the measure $M_{DIST}$ in Equation (2) is only one measure of various alternative measures that may be used to characterize the distance the color intensity in the static region in said any frame and the color intensity distribution of the static region in the reference frame. For example, a variant of Equation (2) in which the factor $(I_{ANY,i} - I_{RFR,i})^2$ is multiplied by a pixel-dependent weight ($V_i$) could be used to place relatively more emphasis on some spatial portions of the static region and relatively less emphasis on other spatial portions of the static region.

Therefore, determining that the persistence requirement has been satisfied comprises determining that the measure ($M_{DIST}$) of the distance between the color intensity distribution in the static region in each frame of the plurality of frames and the color intensity distribution in the static region in the reference frame is less than the specified color intensity distance tolerance.

Therefore, determining that, for each frame of one or more frames in at least one time period during the time interval, that the static region is non-persistent relative to the reference frame comprises determining that a measure of the distance between the color intensity distribution in the static region in each frame of the one or more frames and a color intensity distribution in the static region in the reference frame is not less the specified color intensity distance tolerance.

Returning to FIG. 16, the plurality of frames recited in step 72 encompass the frames whose static region persistence has the persistent value 85. The mere existence of the plurality of frames (i.e., at least two frames having the persistent value 85) demonstrates that the persistence requirement of step 72 is satisfied.

The one or more frames recited in step 73 encompasses the frames whose static region persistence has the non-persistent value 86 in at least one time period having a cumulative time duration $T_{NP}$ equal to $T_{NP1}$. The non-persistence duration requirement is that $T_{NP} < T_1$, wherein $T_1$ is a specified non-persistence duration threshold.

The cumulative time duration $T_{TOT}$ recited in step 74 is a sum of: (1) the cumulative time duration $T_P$ of the plurality of frames whose static region persistence has the persistent value 85 and (2) the cumulative time duration $T_{NP}$ of the one or more frames whose static region persistence has the non-persistent value 86. The persistence duration requirement is that $T_{TOT} > T_2$ and $T_{TOT} > T_{NP}$, wherein $T_2$ is a specified persistence duration threshold.

The cumulative time duration $T_{TOT}$ in FIG. 16 consists of two discrete time intervals of frames whose static region persistence has the persistent value 85 and one time interval of frames whose static region persistence has the non-persistent value 86. In FIG. 16, the combination of the non-persistence duration requirement and the persistence duration requirement is expressed as: $T_{NP} < T_1 < T_2 < T_{TOT}$, wherein $T_{NP} = T_{NP1}$.

FIG. 17 is an example similar to the example of FIG. 16, except that cumulative time duration $T_{TOT}$ in FIG. 17 consists of three discrete time intervals of frames whose static region persistence has the persistent value 85 and two discrete time intervals of frames whose static region persistence has the non-persistent value 86. In FIG. 17, the combination of the non-persistence duration requirement and the persistence duration requirement is expressed as: $T_{NP} < T_1 < T_2 < T_{TOT}$, wherein $T_{NP} = T_{NP1} + T_{NP2}$.

Generally, if the cumulative time duration $T_{TOT}$ consists of at least two discrete time intervals of frames whose static region persistence has the persistent value 85 and M discrete time intervals of frames whose static region persistence has the non-persistent value 86 subject to $M \geq 1$, then the combination of the non-persistence duration requirement and the persistence duration requirement is expressed as: $T_{NP} < T_1 < T_2 < T_{TOT}$, wherein $T_{NP} = T_{NP1} + T_{NP2} + \ldots T_{NP,M}$.

In one embodiment, the persistence duration threshold ($T_2$) is selected as a function of, or in dependence from, the measure of the distance between the color intensity distribution in the static region in each frame of the plurality of frames and the color intensity distribution in the static region in the reference frame. For example, if said distance is discovered or suspected to change slowly over time for any reason (e.g., slowly occurring lighting changes affecting the color intensity of the images on the video frames), it may be desirable to dynamically delay the time at which the alarm is triggered, such as by dynamically varying the persistence duration threshold ($T_2$) in response to one or more changes over time in the measure of the distance between the color intensity distribution in the static region in each frame of the plurality of frames and a color intensity distribution in the static region in the reference frame, in order to observe and assess how said distance varies over time.

It should be noted that non-persistence of the static region in any frame relative to the static region of the reference frame may be due to various causes, such as: a physical occlusion of the static region by a moving object that physically obstructs the static region; a lighting change in the static region, a removal of an abandoned object from the static region, a reinsertion of a removed object into the static region, an insertion into the static region of an object differing from the removed object, etc.

Figure 18:
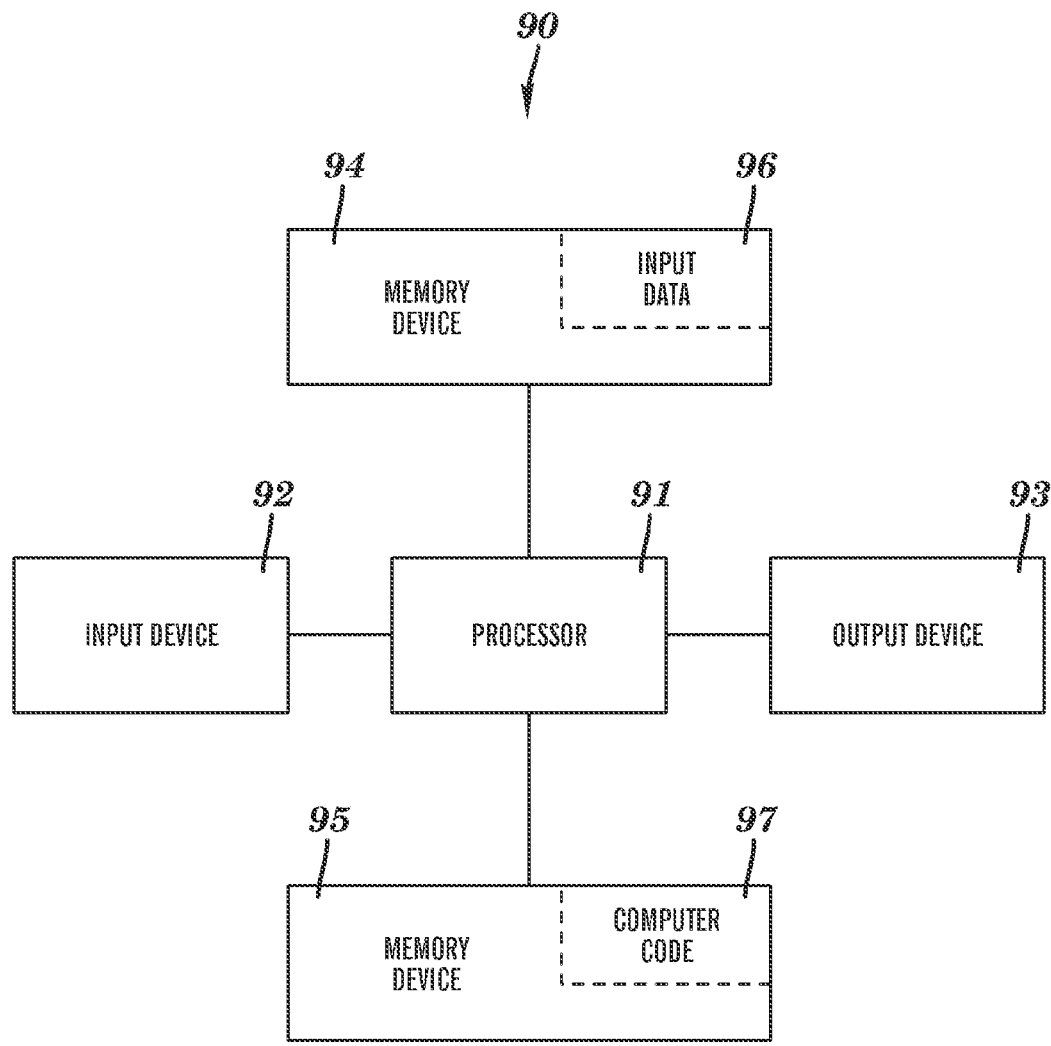
FIG. 18 illustrates a computer system used for real time processing of a sequence of video frames, in accordance with embodiments of the present invention.

FIG. 18 illustrates a computer system 90 used for real time processing of a sequence of video frames, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer display or screen, a magnetic tape, a removable hard disk, a floppy disk, etc. The memory devices 94 and 95 may be a data storage medium such as, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that comprises program code (i.e., computer-executable instructions). The computer code 97 includes an algorithm for real time processing of a sequence of video frames. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 18) may be used as a computer usable storage medium (or program storage device) having a computer readable program embodied therein and/or having other data stored therein, wherein the computer readable program comprises the computer code 97. Generally, a computer program product (or, alternatively, an article of manufacture) of the computer system 90 may comprise said computer usable storage medium (or said program storage device).

Thus the present invention discloses a process for supporting computer infrastructure, integrating, hosting, maintaining, and deploying computer-readable program code into the computer system 90, wherein the code in combination with the computer system 90 is capable of performing a method for real time processing of a sequence of video frames.

Any of the components of the present invention could be created, integrated, hosted, maintained, deployed, managed, serviced, supported, etc. by a service provider who offers to facilitate for real time processing of a sequence of video frames. Thus the present invention discloses a process for deploying or integrating computing infrastructure, comprising integrating computer-readable code into the computer system 90, wherein the code in combination with the computer system 90 is capable of performing a method for real time processing of a sequence of video frames.

In another embodiment, the invention provides a business method that performs the process steps of the invention on a subscription, advertising, and/or fee basis. That is, a service provider, such as a Solution Integrator, could offer to facilitate real time processing of a sequence of video frames. In this case, the service provider can create, integrate, host, maintain, deploy, manage, service, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 18 shows the computer system 90 as a particular configuration of hardware and software, any configuration of hardware and software, as would be known to a person of ordinary skill in the art, may be utilized for the purposes stated supra in conjunction with the particular computer system 90 of FIG. 18. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for real time processing of a sequence of video frames, said method comprising:

analyzing, by a processor of a computer system, a current frame in the sequence and at least one frame in the sequence occurring prior to the current frame, each frame comprising a two-dimensional array of pixels and a frame-dependent color intensity at each pixel, said array of pixels in each frame being a totality of pixels in each frame in the sequence of video frames received in synchronization with a recording of the video frames in real time, said analyzing comprising performing a background subtraction on the at least one frame, said performing the background subtraction determining a background image and also determining a static region mask associated with a static region consisting of a contiguous distribution of pixels in the current frame, said static region mask identifying each pixel in the static region upon the static region mask being superimposed on the current frame, said background image comprising the array of pixels and a background model of the at least one frame and not comprising any moving object, said analyzing determining an existence of a static object consisting of either an abandoned object existing in the static region of the current frame and not existing in the static region of the background image or a removed object existing in the static region of the background image and not existing in the static region of the current frame;

after said analyzing, said processor determining a status of the static object, said status being an abandoned status if the static object is said abandoned object or a removed status if the static object is said removed object;

wherein said determining the status of the static object comprises executing an abandoned/removed object detection algorithm that uses the current frame, the background image, and the static region mask as input and does not use any other information derived from the background subtraction as input;

wherein said executing the abandoned/removed object detection algorithm comprises:
  eroding outer pixels of the static region mask, resulting in eroded pixels and leaving remaining non-eroded pixels of the static region mask, wherein boundary pixels of the non-eroded pixels consist of all non-eroded pixels directly exposed to at least one eroded pixel and are bounded by a contour consisting of an interfacial boundary between the non-eroded pixels and the eroded pixels;
  executing a region growing procedure for the current frame by denoting an input frame used by the region growing procedure to be the current frame, and subsequently executing the region growing procedure, resulting in receiving a growth area $A_{CF}$ as an output growth area from said executing the region growing procedure;
  executing the region growing procedure for the background image by the denoting the input frame used by the region growing procedure to be the background image and subsequently executing the region growing procedure, resulting in receiving a growth area $A_{BI}$ as the output growth area from said executing the region growing procedure; and
  wherein said determining the status of the static object is based on $A_{BI}-A_{CF}$,
  wherein said executing the region growing procedure comprises: (i) selecting first seed pixels from the boundary pixels superimposed on the input frame or selecting first seed pixels as consisting of first seed pixels selected in a prior execution of the region growing procedure for another input frame; (ii) iteratively growing the selected first seed pixels outside the non-eroded pixels to create new seed pixels at neighbor pixels thereof whose color intensity matches the color intensity of the neighbor first seed pixels according to a specified color matching criterion, said iteratively growing creating new seed pixels at the neighbor pixels in successive generations of new seed pixel creation until additional new seed pixels cannot be created; and (iii) determining the output growth area as a composite area of the new seed pixels.

2. The method of claim 1, said method further comprising:
said processor ascertaining that a plurality of requirements has been satisfied, said plurality of requirements comprising a persistence requirement, a non-persistence duration requirement, and a persistence duration requirement;
responsive to said ascertaining that the plurality of requirements has been satisfied, said processor triggering an alert,
wherein the persistence requirement is that the static region in each frame of a plurality of frames is persistent relative to the reference frame, said plurality of frames occurring during a time interval immediately following a time of occurrence of the reference frame,
wherein the non-persistence duration requirement is that for each frame of one or more frames in at least one time period during the time interval, the static region is non-persistent relative to the static region in the reference frame and that a cumulative time duration ($T_{NP}$) encompassed by the one or more frames is less than a specified non-persistence duration threshold ($T_1$),
wherein the persistence duration requirement is that a cumulative time duration ($T_{TOT}$) encompassed by the plurality of frames occurs only after the at least one time period has elapsed and exceeds a specified persistence duration threshold ($T_2$) characterized by $T_2 > T_1$.

3. The method of claim 2,
wherein said determining that the persistence requirement has been satisfied comprises determining that a measure of a distance between a color intensity distribution in the static region in each frame of the plurality of frames and a color intensity distribution in the static region in the reference frame is less than a specified color intensity distance tolerance,
wherein said determining that, for each frame of one or more frames in at least one time period during the time interval that the static region is non-persistent relative to the reference frame comprises determining that a measure of a distance between a color intensity distribution in the static region in each frame of the one or more frames and a color intensity distribution in the static region in the reference frame is not less the specified color intensity distance tolerance.

4. The method of claim 3, wherein the method further comprises said processor dynamically varying the persistence duration threshold in response to one or more changes over time in the measure of the distance between the color intensity distribution in the static region in each frame of the plurality of frames and a color intensity distribution in the static region in the reference frame.

5. The method of claim 2, wherein after said storing the static object and before initiating said ascertaining that the plurality of requirements has been satisfied, the method further comprises:
said processor extracting the static object from the current frame if the determined status is the abandoned status or from the background image if the determined status is the removed status; and
said processor healing the extracted static object into the background image to form a healed image of the background.

6. The method of claim 1, wherein said performing the background subtraction comprises:
executing a mixture of Gaussians algorithm to generate the background model, a foreground image, and the static region;
wherein the mixture of Gaussian algorithm utilizes 3 to 5 Gaussian functions coupled together in a linear combination by Gaussian weight coefficients to define a pixel color intensity probability function; and
wherein the background subtraction constrains a sum of the Gaussian weight coefficients for identifying the foreground image to exceed a specified high weight threshold and constrains a sum of the Gaussian coupling coefficients for identifying the static region to exceed a specified low weight threshold.

7. The method of claim 1, wherein the static region mask determined by said performing said background subtraction on the at least one frame is structured so that the static region mask superimposed on a frame identifies those pixels in the frame that define the static region.

8. A computer program product, comprising a computer readable hardware storage medium having a computer readable program code stored therein, said program code configured to be executed by a processor of a computer system to implement a method for real time processing of a sequence of video frames, said method comprising:

said processor analyzing a current frame in the sequence and at least one frame in the sequence occurring prior to the current frame, each frame comprising a two-dimensional array of pixels and a frame-dependent color intensity at each pixel, said array of pixels in each frame being a totality of pixels in each frame in the sequence of video frames received in synchronization with a recording of the video frames in real time, said analyzing comprising performing a background subtraction on the at least one frame, said performing the background subtraction determining a background image and also determining a static region mask associated with a static region consisting of a contiguous distribution of pixels in the current frame, said static region mask identifying each pixel in the static region upon the static region mask being superimposed on the current frame, said background image comprising the array of pixels and a background model of the at least one frame and not comprising any moving object, said analyzing determining an existence of a static object consisting of either an abandoned object existing in the static region of the current frame and not existing in the static region of the background image or a removed object existing in the static region of the background image and not existing in the static region of the current frame;

after said analyzing, said processor determining a status of the static object, said status being an abandoned status if the static object is said abandoned object or a removed status if the static object is said removed object;

wherein said determining the status of the static object comprises executing an abandoned/removed object detection algorithm that uses the current frame, the background image, and the static region mask as input and does not use any other information derived from the background subtraction as input;

wherein said executing the abandoned/removed object detection algorithm comprises:

eroding outer pixels of the static region mask, resulting in eroded pixels and leaving remaining non-eroded pixels of the static region mask, wherein boundary pixels of the non-eroded pixels consist of all non-eroded pixels directly exposed to at least one eroded pixel and are bounded by a contour consisting of an interfacial boundary between the non-eroded pixels and the eroded pixels;

executing a region growing procedure for the current frame by denoting an input frame used by the region growing procedure to be the current frame, and subsequently executing the region growing procedure, resulting in receiving a growth area $A_{CF}$ as an output growth area from said executing the region growing procedure;

executing the region growing procedure for the background image by the denoting the input frame used by the region growing procedure to be the background image and subsequently executing the region growing procedure, resulting in receiving a growth area $A_{BI}$ as the output growth area from said executing the region growing procedure; and wherein said determining the status of the static object is based on $A_{BI}$–$A_{CF}$;

wherein said executing the region growing procedure comprises: (i) selecting first seed pixels from the boundary pixels superimposed on the input frame or selecting first seed pixels as consisting of first seed pixels selected in a prior execution of the region growing procedure for another input frame; (ii) iteratively growing the selected first seed pixels outside the non-eroded pixels to create new seed pixels at neighbor pixels thereof whose color intensity matches the color intensity of the neighbor first seed pixels according to a specified color matching criterion, said iteratively growing creating new seed pixels at the neighbor pixels in successive generations of new seed pixel creation until additional new seed pixels cannot be created; and (iii) determining the output growth area as a composite area of the new seed pixels.

9. A computer system comprising a processor, a memory coupled to the processor, and a computer readable storage device coupled to the processor, said storage device containing program code configured to be executed by the processor via the memory to implement a method for real time processing of a sequence of video frames, said method comprising:

said processor analyzing a current frame in the sequence and at least one frame in the sequence occurring prior to the current frame, each frame comprising a two-dimensional array of pixels and a frame-dependent color intensity at each pixel, said array of pixels in each frame being a totality of pixels in each frame in the sequence of video frames received in synchronization with a recording of the video frames in real time, said analyzing comprising performing a background subtraction on the at least one frame, said performing the background subtraction determining a background image and also determining a static region mask associated with a static region consisting of a contiguous distribution of pixels in the current frame, said static region mask identifying each pixel in the static region upon the static region mask being superimposed on the current frame, said background image comprising the array of pixels and a background model of the at least one frame and not comprising any moving object, said analyzing determining an existence of a static object consisting of either an abandoned object existing in the static region of the current frame and not existing in the static region of the background image or a removed object existing in the static region of the background image and not existing in the static region of the current frame;

after said analyzing, said processor determining a status of the static object, said status being an abandoned status if the static object is said abandoned object or a removed status if the static object is said removed object;

wherein said determining the status of the static object comprises executing an abandoned/removed object detection algorithm that uses the current frame, the background image, and the static region mask as input and does not use any other information derived from the background subtraction as input;

wherein said executing the abandoned/removed object detection algorithm comprises:

eroding outer pixels of the static region mask, resulting in eroded pixels and leaving remaining non-eroded pixels of the static region mask, wherein boundary pixels of the non-eroded pixels consist of all non-eroded pixels directly exposed to at least one eroded pixel and are bounded by a contour consisting of an interfacial boundary between the non-eroded pixels and the eroded pixels;

executing a region growing procedure for the current frame by denoting an input frame used by the region growing procedure to be the current frame, and subsequently executing the region growing procedure, resulting in receiving a growth area $A_{CF}$ as an output growth area from said executing the region growing procedure;

executing the region growing procedure for the background image by the denoting the input frame used by the region growing procedure to be the background image and subsequently executing the region growing procedure, resulting in receiving a growth area $A_m$ as the output growth area from said executing the region growing procedure; and wherein said determining the status of the static object is based on $A_{BI}$-$A_{CF}$, wherein said executing the region growing procedure comprises: (i) selecting first seed pixels from the boundary pixels superimposed on the input frame or selecting first seed pixels as consisting of first seed pixels selected in a prior execution of the region growing procedure for another input frame; (ii) iteratively growing the selected first seed pixels outside the non-eroded pixels to create new seed pixels at neighbor pixels thereof whose color intensity matches the color intensity of the neighbor first seed pixels according to a specified color matching criterion, said iteratively growing creating new seed pixels at the neighbor pixels in successive generations of new seed pixel creation until additional new seed pixels cannot be created; and (iii) determining the output growth area as a composite area of the new seed pixels.

10. A process for supporting computer infrastructure, said process comprising providing at least one support service for at least one of creating, integrating, hosting, maintaining, and deploying computer-readable program code in a computer system, wherein the program code in combination with the computer system is configured to perform a method for real time processing of a sequence of video frames, said method comprising:

analyzing, by a processor of the computer system, a current frame in the sequence and at least one frame in the sequence occurring prior to the current frame, each frame comprising a two-dimensional array of pixels and a frame-dependent color intensity at each pixel, said array of pixels in each frame being a totality of pixels in each frame in the sequence of video frames received in synchronization with a recording of the video frames in real time, said analyzing comprising performing a background subtraction on the at least one frame, said performing the background subtraction determining a background image and also determining a static region mask associated with a static region consisting of a contiguous distribution of pixels in the current frame, said static region mask identifying each pixel in the static region upon the static region mask being superimposed on the current frame, said background image comprising the array of pixels and a background model of the at least one frame and not comprising any moving object, said analyzing determining an existence of a static object consisting of either an abandoned object existing in the static region of the current frame and not existing in the static region of the background image or a removed object existing in the static region of the background image and not existing in the static region of the current frame;

after said analyzing, said processor determining a status of the static object, said status being an abandoned status if the static object is said abandoned object or a removed status if the static object is said removed object;

wherein said determining the status of the static object comprises executing an abandoned/removed object detection algorithm that uses the current frame, the background image, and the static region mask as input and does not use any other information derived from the background subtraction as input;

wherein said executing the abandoned/removed object detection algorithm comprises:

eroding outer pixels of the static region mask, resulting in eroded pixels and leaving remaining non-eroded pixels of the static region mask, wherein boundary pixels of the non-eroded pixels consist of all non-eroded pixels directly exposed to at least one eroded pixel and are bounded by a contour consisting of an interfacial boundary between the non-eroded pixels and the eroded pixels;

executing a region growing procedure for the current frame by denoting an input frame used by the region growing procedure to be the current frame, and subsequently executing the region growing procedure, resulting in receiving a growth area $A_{CF}$ as an output growth area from said executing the region growing procedure;

executing the region growing procedure for the background image by the denoting the input frame used by the region growing procedure to be the background image and subsequently executing the region growing procedure, resulting in receiving a growth area $A_{BI}$ as the output growth area from said executing the region growing procedure; and wherein said determining the status of the static object is based on $A_{BI}$-$A_{CF}$, wherein said executing the region growing procedure comprises: (i) selecting first seed pixels from the boundary pixels superimposed on the input frame or selecting first seed pixels as consisting of first seed pixels selected in a prior execution of the region growing procedure for another input frame; (ii) iteratively growing the selected first seed pixels outside the non-eroded pixels to create new seed pixels at neighbor pixels thereof whose color intensity matches the color intensity of the neighbor first seed pixels according to a specified color matching criterion, said iteratively growing creating new seed pixels at the neighbor pixels in successive generations of new seed pixel creation until additional new seed pixels cannot be created; and (iii) determining the output growth area as a composite area of the new seed pixels.

* * * * *